United States Patent [19]
Ohwaki et al.

[11] Patent Number: 6,074,108
[45] Date of Patent: Jun. 13, 2000

[54] PHOTOGRAPHIC SENSITIVE MATERIAL PROCESSING EQUIPMENT, METHOD OF CLEANING THE PHOTOGRAPHIC SENSITIVE MATERIAL PROCESSING EQUIPMENT, CLEANING CARTRIDGE, CLEANING MATERIAL, CLEANING MEMBER RECOGNITION SYSTEM AND CLEANING MEMBER

[75] Inventors: Junichi Ohwaki; Mikio Inoue; Hiroshi Miyawaki; Takahisa Miyamori; Yoshiyuki Yamaji, all of Wakayama, Japan

[73] Assignee: Noritsu Koki Co., Ltd., Wakayama-ken, Japan

[21] Appl. No.: 08/829,261

[22] Filed: Mar. 31, 1997

[30] Foreign Application Priority Data

| Jan. 4, 1996 | [JP] | Japan | 8-079121 |
| Jan. 4, 1996 | [JP] | Japan | 8-079122 |
| Apr. 11, 1996 | [JP] | Japan | 8-089165 |
| Apr. 22, 1996 | [JP] | Japan | 8-100297 |

[51] Int. Cl.[7] .............................. G03D 5/00; B08B 7/00; B08B 1/02
[52] U.S. Cl. ............................ 396/564; 134/6; 15/104.93
[58] Field of Search ..................................... 396/564, 210, 396/263; 352/244; 15/51, 100, 210.1, 104.93; 451/530, 59; 134/6

[56] References Cited

U.S. PATENT DOCUMENTS

| 2,606,409 | 8/1952 | Gordon | 15/210.1 |
| 3,069,815 | 12/1962 | Valentine | 451/530 |
| 3,078,759 | 2/1963 | Brunswick | 15/210.1 |
| 3,644,953 | 2/1972 | Christiansin | 15/51 |
| 4,933,015 | 6/1990 | White | 134/6 |
| 5,136,317 | 8/1992 | Goto et al. | 396/210 |
| 5,343,264 | 8/1994 | Itoh et al. | 396/263 |
| 5,832,556 | 11/1998 | Eyler | 15/104.93 |

OTHER PUBLICATIONS

Patent Abstracts of Japan; Publ No 07270994; Publ Date Oct. 20, 1995; Appln No. 06062792; Appln Date Mar. 31, 1994; Applicant Noritsu Koki Co Ltd; Inventors Motooka Eiji, Oku Hiroshi; Intl Class G03D 3/00; Cleaning Film and Cartridge Housing the Same.

Patent Abstracts of Japan; Publ No. 07281311; Publ Date Oct. 27, 1995; Appln No. 06065925; Appln Date Apr. 4, 1994; Applicant Noritsu Koki Co Ltd; Inventors Motooka Eiji, Oku Hiroshi; Intl Class G03D 27/46; Photographic Processing Device.

Patent Abstracts of Japan; Publ No. 06335998; Publ Date Dec. 6, 1994; Appln No. 05148609; Appln Date May 27, 1993; Applicant Toray Ind Inc; Inventors Kawazua Yukio, Imai Shiro; Intl Class G03D B32D 27/12; Extremely Fine Fiber Knitted Laminate.

Patent Abstracts of Japan; Pub No. 06223338; Publ Date Aug. 12, 1994; Appln No. 05009670; Appln Date Jan. 25, 1993; Applicant Osaka Gas Co Ltd; Inventor Nakajima Koji; Intl Class G11B 5/41; Cleaning Card.

Patent Abstracts of Japan; Publ No. 06148798; Publ Date May 27, 1994; Appln No. 04295141; Appln Date Nov.11, 1992; Applicant Olympus Optical Co Ltd; Inventor Osada Hajime; Intl Class G03C 1/795; Photographic Film and Magnetic Head Cleaning Film.

*Primary Examiner*—D. Rutledge
*Attorney, Agent, or Firm*—Fulbright & Jaworski, LLP

[57] ABSTRACT

A method of cleaning a film transport unit (5), in which a cleaning leader (80) formed of a synthetic fiber (81) hardened with a resin (82) is transported through a transport path of the film transport unit, and the cleaning leader (80) removes substances adhering to a magnetic head (32a) disposed in the transport path, with said cleaning leader. Preferably, the synthetic fiber is hardened by being impregnated with a resin (82) selected from urethane resin, acrylic resin and silicone resin. Preferably, the cleaning leader (80) is elongated to be an identical or similar shape to a film (2) transported through the film transport unit (5). At least a leading end of the cleaning leader is hardened.

26 Claims, 22 Drawing Sheets

PHOTOGRAPHIC SENSITIVE MATERIAL PROCESSING EQUIPMENT, METHOD OF CLEANING THE PHOTOGRAPHIC SENSITIVE MATERIAL PROCESSING EQUIPMENT, CLEANING CARTRIDGE, CLEANING MATERIAL, CLEANING MEMBER RECOGNITION SYSTEM AND CLEANING MEMBER

BACKGROUND OF THE INVENTION

1. Field of the Invention

This invention relates to a method of cleaning a detector and the like including a magnetic head of photographic sensitive material processing equipment by using the cleaning leader, a cartridge for storing the cleaning leader, a material suitable for the cleaning leader, a system for distinguishing a cleaning member from a photographic sensitive material, and a cleaning member having a configuration suited to the system.

2. Description of the Related Art

A transport path for transporting a photographic sensitive material such as film in photographic sensitive material processing equipment is vulnerable to an accumulation of dust from the film in the course of repeated film transport. Such dust adversely affects the transport of the photographic sensitive material. Particularly, in the case of a film having a magnetic recording section for use in an advanced photographic system, a magnetic layer and a protective layer for protecting the magnetic layer may become separated and adhere to the magnetic head. This lowers the reading precision of the magnetic head.

To avoid such a situation, cleaning operations are carried out on a regular basis to clean the film transport path and the magnetic head and sensors arranged on the transport path. Techniques used in such cleaning operations include a head cleaner disclosed in Japanese Utility Model Publication S63-38416 (known technique 1), a cleaning card disclosed in Japanese Patent Laying-Open Publication H3-203806 (known technique 2), and a special photographic film disclosed in Japanese Patent Laying-Open Publication H5-225532 (known technique 3).

Incidentally, a cloth such as a nonwoven cloth is not suited for use in cleaning since it has a self dust creating nature whereby the fibers constituting the cloth become napped and fall off during a long period of use for cleaning purposes. Thus, known technique 1 uses a cleaning tape having numerous pores formed therein to hold a cleaning solution. This cleaning tape is stored in a cassette tape case for use. In such a use condition, rigidity is not required of the cleaning member. However, in equipment for processing a photographic sensitive material such as photographic film, the cleaning member must have a certain degree of rigidity to be transported in an effective way through the transport path. The reason is that the construction of the photographic sensitive material processing equipment makes it difficult to carry out a cleaning operation with the cleaning member stored in the case like cassette tape.

Known technique 2 relates to a cleaning card having a nonwoven cloth applied to one surface of a thin substrate and defining numerous pores, to be usable both as the wet type and as the dry type. However, this cleaning card includes burs formed outside the substrate for use as the dry type, which could damage the magnetic head. This cleaning card cannot be said well suited for cleaning purposes.

Known technique 3 uses a photographic film defining level differences (ridges, recesses, or holes) for cleaning a magnetic head. Since a photograph film is used also for cleaning purposes, the film has the rigidity to withstand transport, but only particular portions of the photographic film are available for cleaning.

In dealing with the disadvantages of the above known techniques, Inventors have taken up synthetic fibers which are materials different from a nonwoven cloth. Among these synthetic fibers is one known as wiping cloth. The wiping cloth is characterized by minimal self dust creation. With this characteristic, the wiping cloth has also the advantage of being usable both as the dry type and as the wet type. The wiping cloth can be used in manufacture of magneto-optic disks, cleaning of printed circuit boards, and manufacture of contact lenses. Inventors have found that the wiping cloth may also be used for cleaning photographic sensitive material processing equipment.

Although suited for cleaning photographic sensitive material processing equipment, the wiping cloth has a drawback of lacking in rigidity so that it cannot pass smoothly through the transport path in the photographic sensitive material processing equipment. The rigidity to withstand transport is required particularly when cleaning the magnetic head of the photographic sensitive material processing equipment. It is troublesome and undesirable to remove the magnetic head in such a case and wipe dirt off the magnetic head with a cotton pin or the like. It has therefore been necessary to increase rigidity in order to use such a synthetic fiber for automatically cleaning the to make it be possible to launder equipment of the processing of material of the photographic sensitive material processing equipment.

SUMMARY OF THE INVENTION

An object of this invention is to provide a method of automatically cleaning photographic sensitive material processing equipment by selecting and using a cleaning material suited to the photographic sensitive material processing equipment.

Another object of this invention is to provide a cleaning cartridge which may be handled in the same way as photograph film in photographic sensitive material processing equipment.

The above objects are fulfilled, according to this invention, by transporting a cleaning leader formed of a synthetic fiber hardened with a resin, through a transport path of the photographic sensitive material processing equipment, and removing substances adhering to a magnetic head disposed in the transport path is removed by the cleaning leader.

The synthetic fiber hardened with a resin provides rigidity to withstand the transport through the photographic sensitive material processing equipment. The cleaning leader formed of such a material may be transported automatically through the photographic sensitive material processing equipment, to remove dirt from the magnetic head automatically.

Where a wiping cloth of minimal self dust creation is selected as the synthetic fiber, the cleaning leader may used selectively as the wet type and dry type according to a stained degree of the magnetic head.

The synthetic fiber may be hardened by being impregnated with a resin selected from urethane resin, acrylic resin and silicone resin. By this resin impregnation, an additive may be added to the resin. The additive provides varied advantages. The additive may be an antistatic agent or a pigment, for example. With the additive, advantages may be obtained such as charge prevention, light shielding quality, friction control and coloring.

Preferably, the cleaning leader is elongated to be an identical or similar shape to a film transported through the photographic sensitive material processing equipment. This cleaning leader may be mounted in a cartridge for storing a film, to be handled with facility like a film.

At least a leading end of the cleaning leader may be hardened. When drawing out the cleaning leader wound on a spool in the cartridge, the spool is rotated in an unwinding direction to force the leading end of the cleaning leader out of a cartridge opening (This operation is called a thrusting operation). The leading end should be hardened because rigidity is required in time of the thrusting operation in particular.

Other features and advantages of this invention will be apparent from the following description of the embodiments to be taken with reference to the drawings.

DETAILED DESCRIPTION OF THE PREFERRED EMBODIMENTS

[First Embodiment]

A preferred embodiment of this invention will be described with reference to the drawings.

Figure 1:
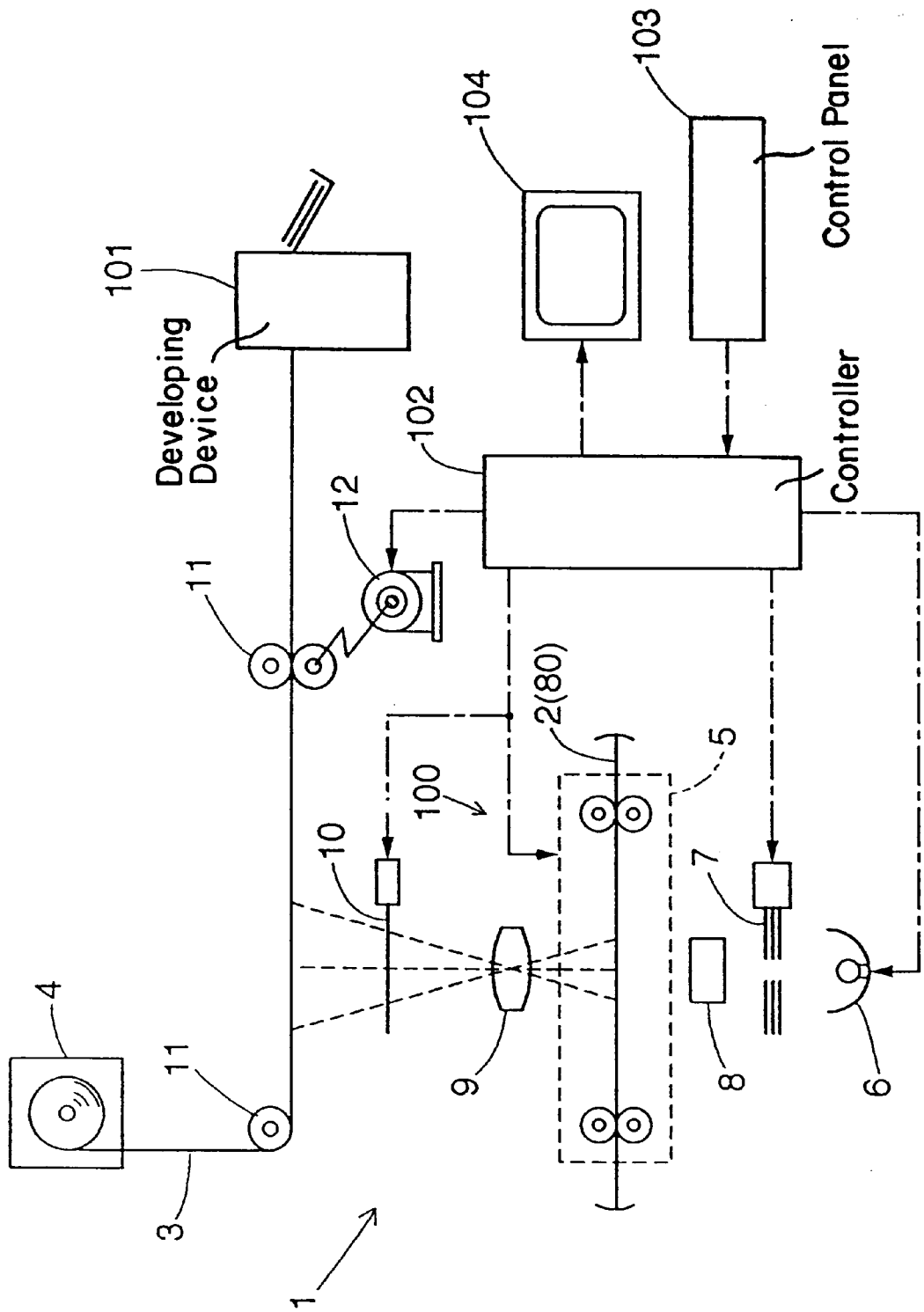
FIG. 1 is a schematic view of a photographic printing apparatus.

As shown in FIG. 1, a photographic printing apparatus 1 includes an exposing device 100 for projecting and exposing images of a film 2 onto printing paper 3, a developing device 101 for developing the printing paper 3, and a controller 102 for controlling operations of various components of the apparatus. The controller 102 is connected to a control panel 103 for inputting various control instructions, and a monitor 104 for displaying image information read by a scanner not shown.

When the film 2 to be printed is inserted into the exposing device 100, image information for each frame is read from the film 2 and transmitted to the controller 102. The controller 102 determines exposing conditions for each frame based on the image information read from the film 2. Then, the controller 102 simulates and displays on the monitor 104 images expected to appear on the printing paper 3 as a result of exposure with the conditions determined.

When a cleaning leader 80 is inserted, a path where the film 2 is transported is cleaned.

The operator of the photographic printing apparatus 1 observes what is displayed on the monitor 104. If a proper image is not obtained, the operator may input instructions to correct the exposing conditions through the control panel 103 can be inputted. In response to the correcting instructions, the controller 102 corrects the exposing conditions, and determines final exposing conditions. Based on the exposing conditions determined, the controller 102 controls varied components of the exposing device 100 to expose the image information of the film 2 onto the printing paper 3 drawn from a printing paper magazine 4.

Figure 10:
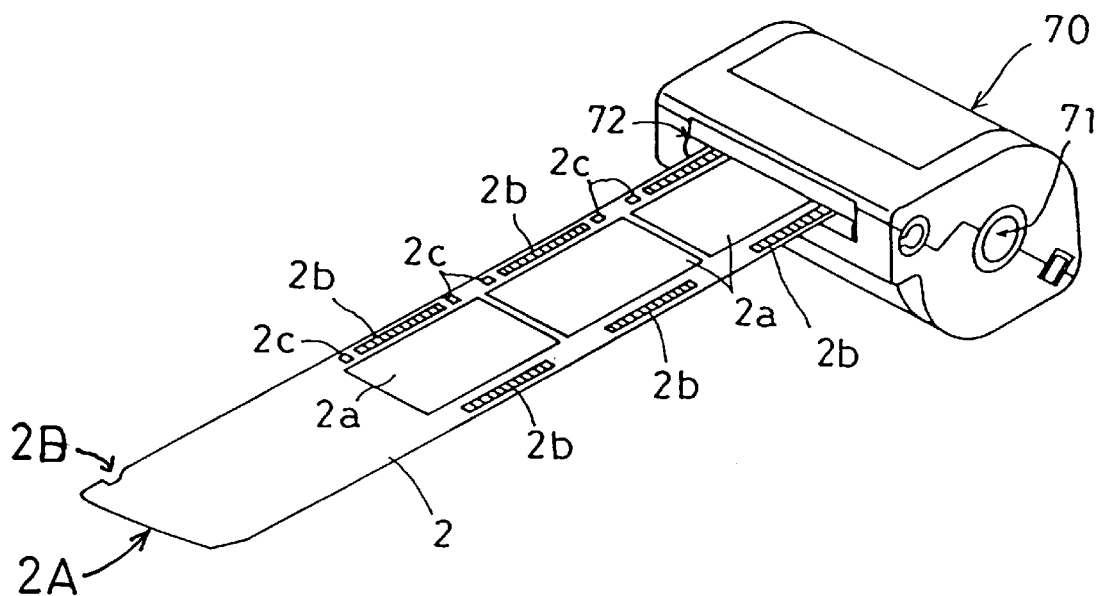
FIG. 10 is a perspective view of a film drawn from a cartridge.

The film 2 will be described with reference to FIG. 10. This film 2 is used in a so-called advanced photographic system, and includes image regions 2a for recording images, magnetic recording sections 2b arranged along opposite sides of the image regions 2a, and perforations 2C. The film 2 is stored as wound on a spool inside a cartridge 70. The film 2 is automatically drawn out through a draw opening 72 by inserting a drive shaft into a bore 71 and rotating the spool.

Each component will be described hereinafter.

The exposing device 100 includes a film transport unit 5 for transporting and positioning the film 2, an exposing light source 6, a light adjustment filter 7 with yellow, magenta and cyan filters movable to and from an exposing optical path for adjusting a color balance of irradiating light from the light source 6, a mirror tunnel 8 for uniformly mixing colors of light having the color balance adjusted by the light adjustment filter 7, a printing lens 9 for forming the image information of the film 2 on the printing paper 3, a shutter 10, transport rollers 11 for transporting the printing paper 3, and a motor 12 for driving the transport rollers 11.

The light adjustment filter 7 and shutter 10 are controlled by the controller 102. That is, the position of each filter of the light adjustment filter 7 and the release time, i.e. exposure time of the shutter 10 are controlled based on the exposing conditions determined by the controller 102.

The motor 12 transports the printing paper 3 frame by frame under control of the controller 102.

The construction of the film transport unit 5 of the exposing device 100 will be described hereinafter. This film transport unit 5 is one example of photographic sensitive material processing equipment.

The film transport unit 5 includes a pair of frames consisting of an upper unit 20 and a lower unit 21 connected to each other to be pivotable about an axis 22 and biased to an open position by springs 23.

Figure 2:
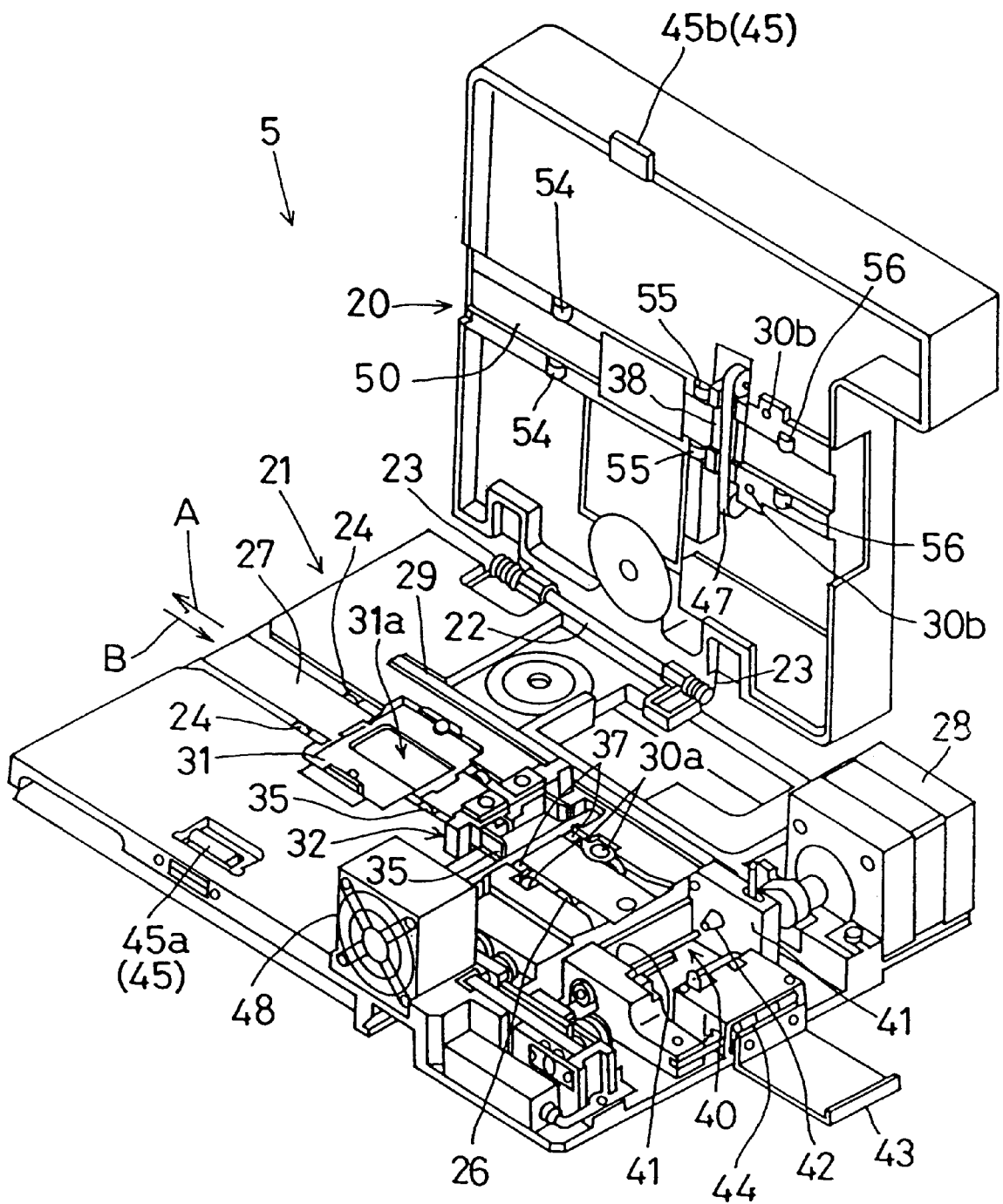
FIG. 2 is a perspective view of a film transport unit.
Figure 3:
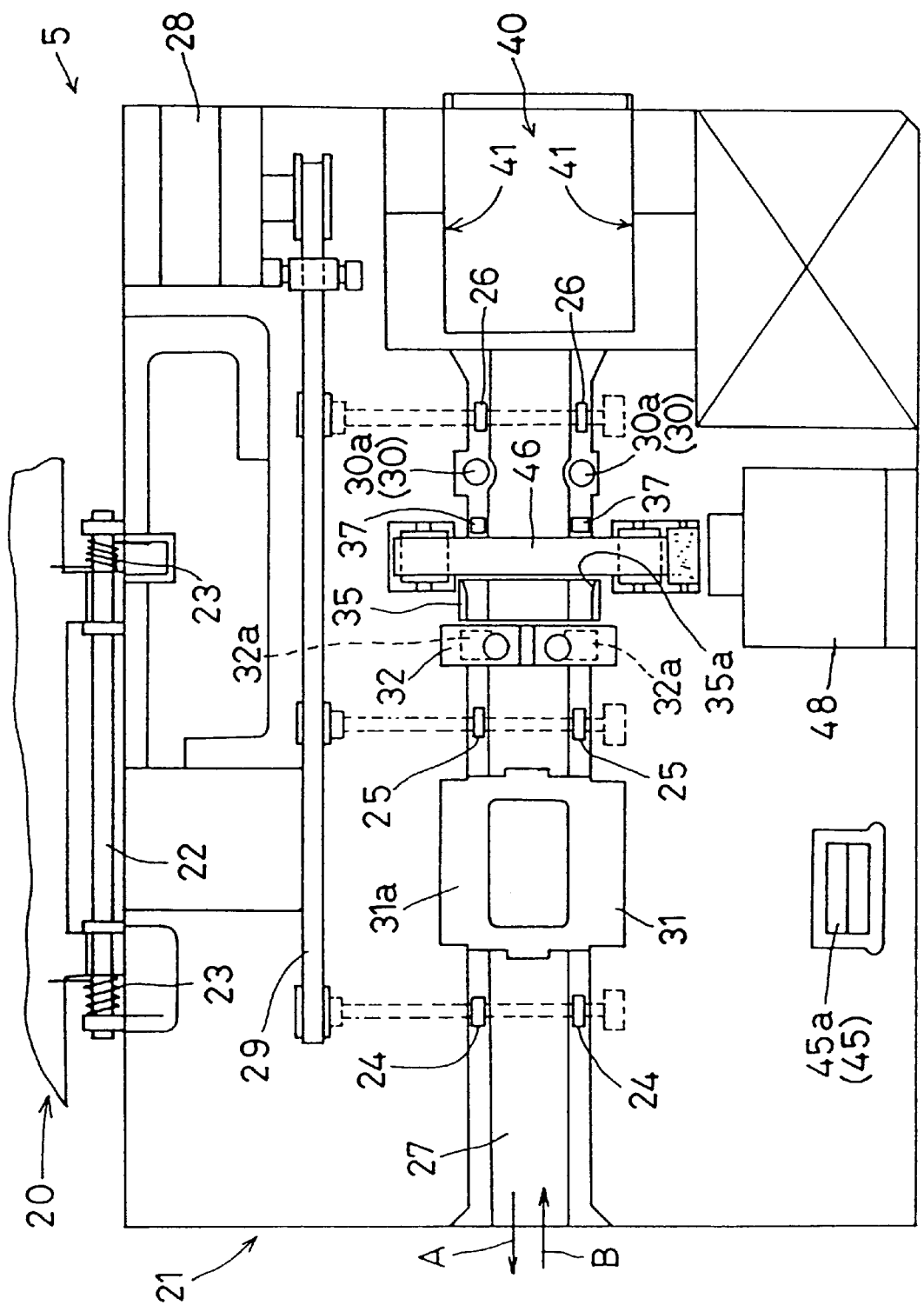
FIG. 3 is a plan view of the film transport unit.

FIG. 2 shows the open position the upper unit 20 and lower unit 21. FIG. 3 shows an upper surface of the lower unit 21.

Details of the lower unit 21 are shown in FIGS. 2 and 3. Drive rollers 24, 25 and 26 are provided for transporting the film 2.

A lower guide 27, with a recess along which an image plane of the film 2 passes, supports and guides the right and left sides of the film 2. A motor 28 drives the drive rollers 24, 25 and 26 through a belt 29. An optical sensor 30 including a light emitter 30a and a light receiver 30b detects optical data of the film 2. A negative mask 31 has an opening 31a. for defining a region of an image portion of the film 2 to be printed on the printing paper 3.

A magnetic head unit 32 includes a pair of magnetic heads 32a for reading information magnetically recorded in the magnetic recording sections 2b of the film 2. The pair of magnetic heads 32a are arranged to correspond to the magnetic recording sections 2b at the opposite sides shown in FIG. 10. A lower cleaning belt 46 and a fan 48 constitute part of a dust removing device for removing dust from the film surface. The drive motor 28 drives the drive rollers 24, 25 and 26 through the belt 29. The drive motor 28 also drives the lower cleaning belt 46 through a transmission mechanism not shown.

A guide member 35 is disposed between the magnetic head unit 32 and lower cleaning belt 46. Slopes 35a are formed for the film 2 having passed through the dust removing device to be transported smoothly to the magnetic head unit 32. Movable head elements 37 constituting part of a cleaning head are arranged adjacent the lower cleaning belt 46.

A cartridge holder 40 holds the cartridge 70 containing the film 2. Support in a longitudinal direction of the cartridge 70 is provided by a pair of walls 41 for holding the cartridge 70 therebetween. The walls 41 include projections 42 for engaging the bore 71 of the cartridge 70 to position the cartridge 70. A lid 43 is pivotable about an axis 44 between an open position and a closed position. The lid 43 may be opened as shown in FIG. 2 to load the cartridge 70 in place.

The drive motor 28 transports the film 2, and drives the lower cleaning belt 46 and the cleaning leader 80 described later.

Details of the upper unit 20 are shown in FIG. 2. An upper guide 50, with a recess along which the image plane of the film 2 passes, supports and guides the right and left sides of the film 2 in combination with the lower guide 27. Pressure rollers 54, 55 and 56 are arranged in positions opposed to the drive rollers 24, 25 and 26, respectively, when the upper unit 20 and lower unit 21 are closed. The light receiver 30b is disposed in a position opposed to the light emitter 30a of the optical sensor 30. An upper cleaning belt 47 is disposed in a position opposed to the lower cleaning belt 46. The upper cleaning belt 46 is driven by a motor and a transmission mechanism not shown. Fixed head elements 38 are disposed in positions opposed to the movable head elements 37.

The upper unit 20 and lower unit 21 are engageable through an engaging device 45. The engaging device 45 includes a hitch 45a provided on the lower unit 21 and a pawl 45b provided on the upper unit 20.

Next, an operation of the above photographic printing apparatus to print the film 2 will be described briefly.

The cartridge 70 is set to the cartridge holder 40 with the film transport unit 5 opened. After setting the cartridge 70, the film transport unit 5 is closed. Then, the film 2 is drawn from the cartridge 70 in response to a predetermined start signal. The film 2 drawn out is transported by the drive motor 28 in the direction of arrow A in FIG. 2 or 3.

The film 2 drawn out passes through the optical sensor 30 first, where the information recorded on the film 2 is read optically. Next, the film 2 passes through the cleaning head where dust is removed from the magnetic recording sections 2b of the film 2. Immediately after the cleaning head, the film 2 passes between the upper and lower cleaning belts 46 and 47 to receive dust removing treatment over an entire area transversely of the film 2. Dust removed is discharged from the film transport unit 5 by the fan 48.

After the film 2 passes through the upper and lower cleaning belts 46 and 47, the magnetic head unit 32 reads the information from the magnetic recording sections 2b of the film 2.

While the film 2 is transported in the direction of arrow A, the magnetic head unit 32 reads information corresponding to all frames 2a. Then the film 2 is once rewound in the direction of arrow B. The film 2 is transported in the direction of arrow A again, and the exposing device 100 prints the frames 2a of the film 2. When exposing and printing the film 2, the frames 2a of the film 2 are stopped and positioned in the opening 31a for exposure. Alternatively, the film 2 may be rewound in the direction of arrow B to be exposed and printed.

The cleaning leader for cleaning the transport path of the film transport unit 5 will be described.

Figure 9:
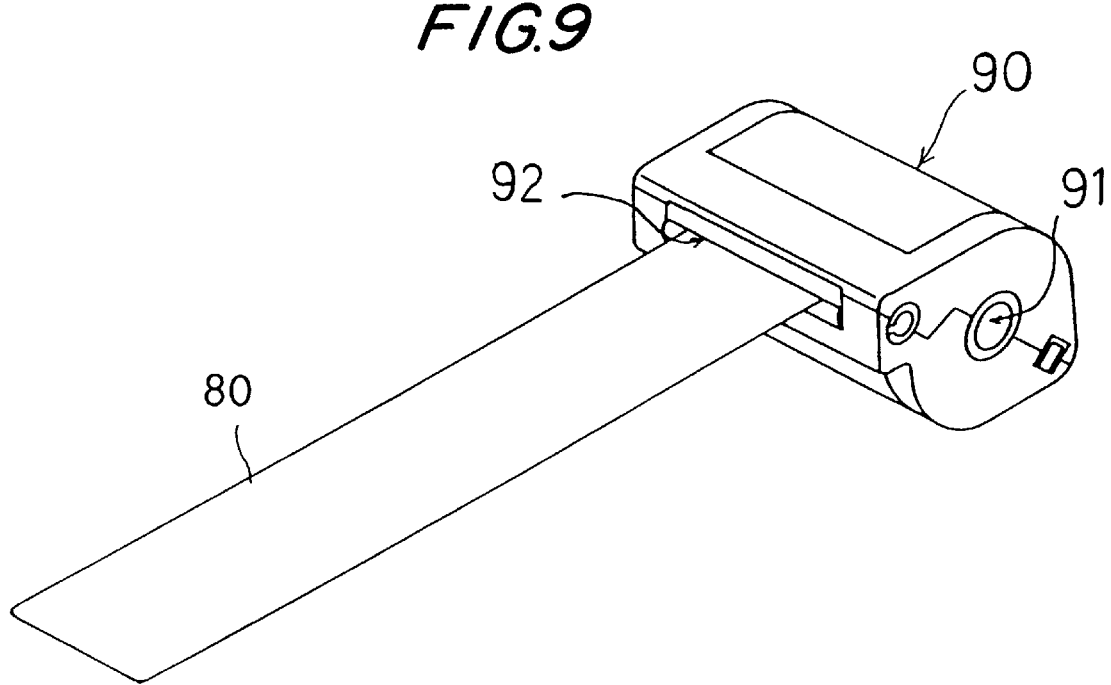
FIG. 9 is a perspective view of the cleaning leader drawn from a cartridge.

As shown in FIG. 9, the cleaning leader 80 is stored in a cartridge 90 having the same shape as the cartridge 70 storing the film 2. The cleaning leader 80 has an elongated shape as does the film 2, with an equal width. The cleaning leader 80 and film 2 may of course have an identical shape. The cleaning leader 80 may have a smaller width than the film 2. The cleaning leader 80 need not have the same length as the film 2, but may only have a length necessary for cleaning purposes. The cartridge 90 has a bore 91 for driving a spool, and a draw opening 92.

Figure 4:
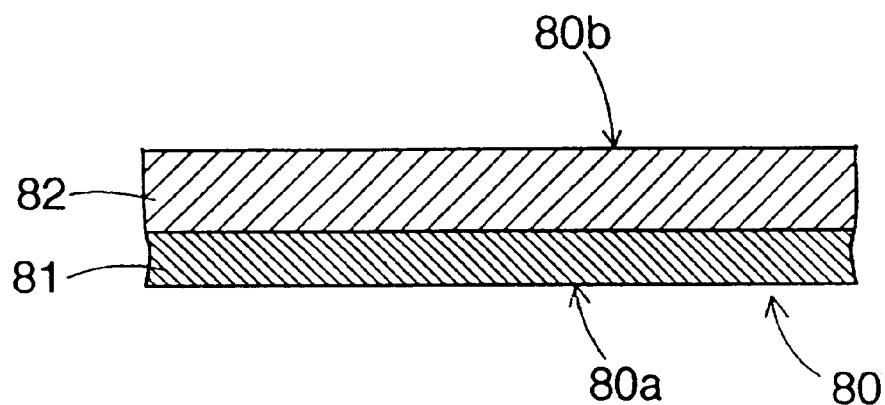
FIG. 4 is an enlarged sectional view of a cleaning leader.

Next, a material suited to the cleaning leader 80 will be described with reference to FIGS. 4 through 7. FIG. 4 is an enlarged view taken from a position of arrow C in FIG. 8 described later. This cleaning leader 80 is formed of a synthetic fiber 81 and a resin 82 impregnating the synthetic fiber 81 (the impregnation with resin 82 will be described later). Specifically, the synthetic fiber 81 may comprise a wiping cloth (product name: Zavena Minimax) manufactured by Kanebo Kabushiki Kaisha. This material is minimal in self dust creation, and has higher cleaning performance than nonwoven cloths. The material also has excellent water absorptive and retentive features, may be used selectively as the "wet type" or "dry type" according to a soiled degree of magnetic heads. There is very little chance of recontamination since little elution of residual ions and the like occurs and stains are trapped inside the fiber. Minute particles may be wiped off, which could not be cleaned with conventional nonwoven cloths. Further, since no abrasive is employed, the magnetic head 32*a* may be protected from wear when cleaned.

A number of advantages can be expected from use of such synthetic fiber 81 in cleaning the film transport unit 5. However, since the synthetic fiber 81 itself has low rigidity, it would be difficult to transport the cleaning leader 80 formed of only synthetic fiber 81 in the same way as the film 2 is transported.

Figure 5:
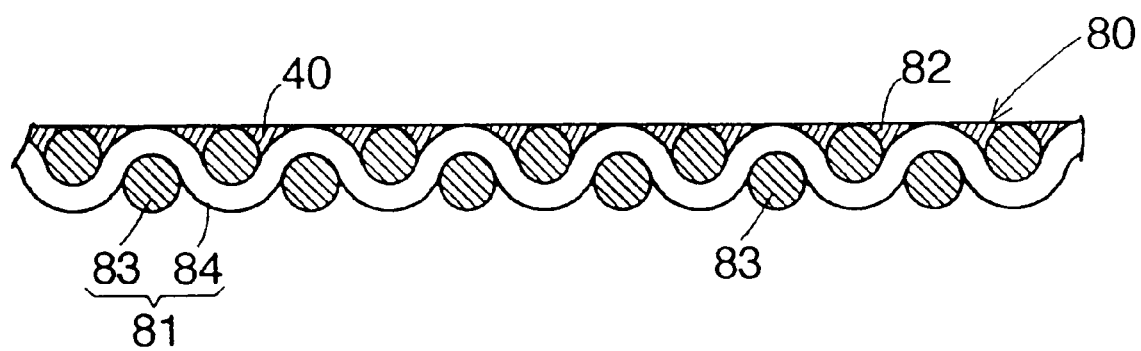
FIG. 5 is an enlarged sectional view of the cleaning leader.

Thus, as shown in FIG. 4, a hardening treatment (hard finish) is provided to make the synthetic fiber 81 rigid. Resin impregnation or resin coating is a suitable hard finish. The impregnating resin 82 is a fraction, preferably about ¼, of a thickness of the cleaning leader 80. By impregnating with the resin 82, the cleaning leader 80 has a cleaning surface 80*a* for actually used in cleaning and an impregnated surface 80*b*. By adjusting the quantity of the impregnating resin 82, the rigidity of the cleaning leader 80 may be adjusted. However, it is necessary to prevent the resin 82 from oozing from the cleaning surface 80*a*. FIG. 5 shows a structure closer to reality of what is shown in FIG. 4. The synthetic fiber 81 includes wefts 83 and warps 84. Typical examples of the impregnating resin 82 includes urethane resin, acrylic resin and silicone resin.

By impregnating with the resin 82, the cleaning leader 80 is given increased rigidity without impairing the above-mentioned advantages of the synthetic fiber 81. Besides, additional advantages may be obtained such as charge prevention, light shielding quality, friction control and coloring by adding an antistatic agent, a pigment and the like to the resin 82. By adding a black pigment, for example, the cleaning leader 80 may be finished with a black outward appearance to secure improved light shielding quality.

Moreover, the impregnating resin 82 facilitates a shaping process. The cleaning leader 80 is elongated as is the film 2. To finish this configuration with well-defined end surfaces, the synthetic fiber 81 not impregnated with the resin 82 would require heat cutting or ultrasonic processing. However, with the impregnating resin 82 to increase rigidity, the product may be shaped with a Thomson blade in wide use, to reduce shaping cost.

Figure 6:
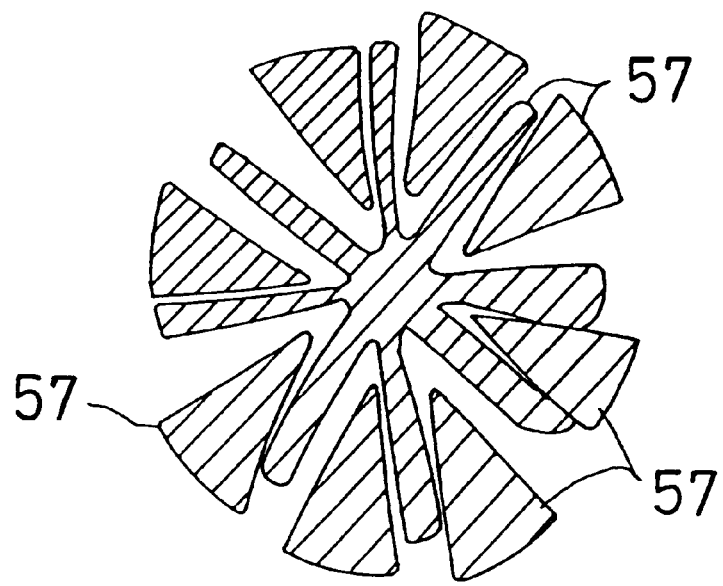
FIG. 6 is an enlarged sectional view of fibrils of a synthetic fiber (wiping cloth)
Figure 7:
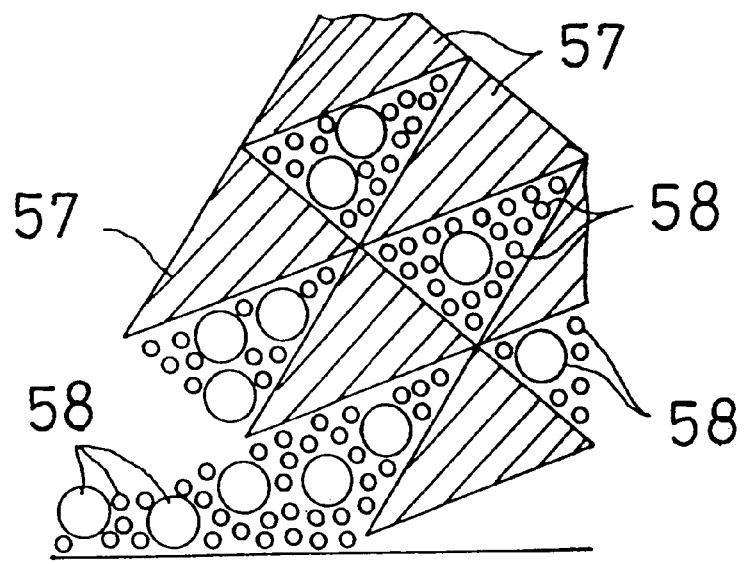
FIG. 7 is a view showing a principle of the synthetic fiber (wiping cloth) capturing dirt.

FIG. 6 shows a sectional shape of fibrils 57 used in the synthetic fiber 81. These fibrils 57 are named "Berima X" and used in the above-mentioned product Savina Minimax. The fibrils 57 are hyperfine fibers of 0.1 deniers. FIG. 7 shows a principle of capturing dirt 58. The fibrils 57 are formed of polyester and nylon to have a wedge-like section to fit surfaces of detectors and the like of the film transport unit 5 efficiently and capture dirt reliably.

Figure 8:
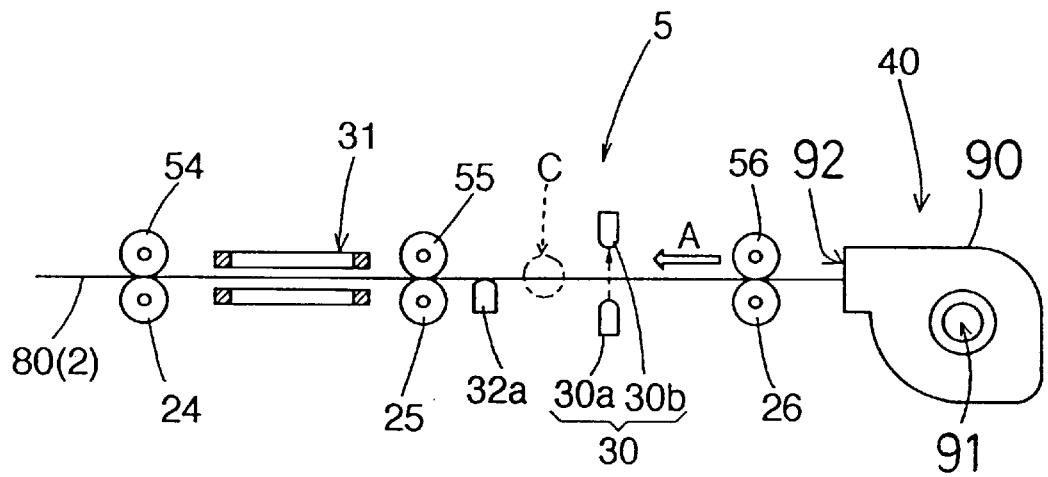
FIG. 8 is a view showing a cleaning operation.

Next, an operation to clean the transport path in the film transport unit 5 will be described with reference to FIG. 8. FIG. 8 schematically shows only the main detectors described with reference to FIGS. 2 and 3.

First, the cartridge 90 containing the cleaning leader 80 is set to the cartridge holder 40 of the film transport unit 5. After setting the cartridge 90, the film transport unit 5 is closed. Subsequently, with a predetermined start signal, the spool of the cartridge 90 is rotated in the rewinding direction to move the leading end of the cleaning leader 80 out of the draw opening 92 (This operation is called a thrusting operation). To enable this thrusting operation, the cleaning leader 80 needs the rigidity equal to that of the film 2. Since the cleaning leader 80 is impregnated with the resin 82, the thrusting operation is effected with no trouble. There is a distance between the position to which the cartridge 90 is set and the position of the magnetic heads 32*a*. Therefore, the cleaning leader 80 must be drawn at least to the position of the magnetic heads 32*a*. The cleaning leader 80, impregnated with the resin 82 to have increased rigidity, may be transported smoothly to the magnetic heads 32*a*.

Once drawn out, the cleaning leader 80 is transported through the transport path by the transport rollers 24, 25 and 26 to clean the magnetic heads 32*a*. The cleaning leader 80 may be completely drawn out of the cartridge 90. In this case, the transport rollers 24, 25 and 26 transport the cleaning leader 80 in the direction to store it in the cartridge 90. Then, one end of the cleaning leader 80 is attached to the spool of the cartridge 90 again (This operation is called an attaching operation). This attaching operation may also be effected smoothly by virtue of improved rigidity. When the cleaning operation is completed, the cleaning leader 80 is stored in the cartridge 90.

Figure 11:
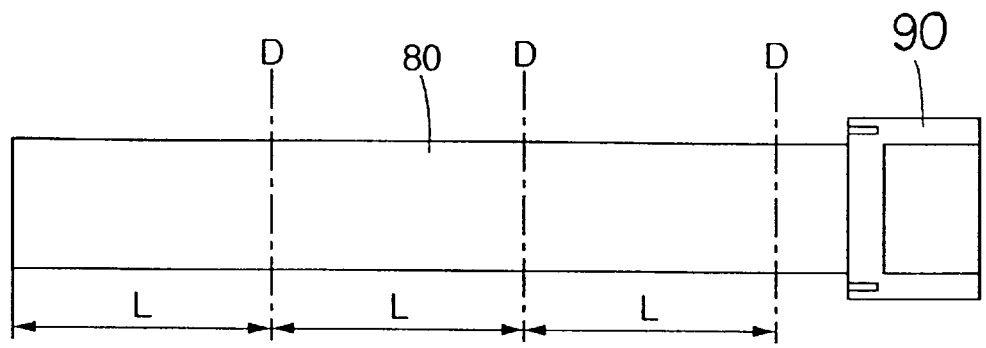
FIG. 11 is a view showing a different use of the cleaning leader.

The cleaning leader 80 may be used as shown in FIG. 11. Where a length L in the longitudinal direction of the cleaning leader 80 is determined as necessary for each cleaning operation, each length L is cut (along a cutting line D) for use and then the cut portion is discarded. In this way, the cleaning leader 80 may be used in clean condition at all times. It is desirable to cut the cleaning leader 80 always to leave the forward end in the same shape. The cleaning leader 80 may be marked beforehand to indicate cutting positions.

Modified embodiments of this invention will be described hereunder.

(1) As the hardening treatment, apart from impregnating with the resin 82, a sheet of PET (polyethylene terephthalate) or the like may be applied to the synthetic fiber 81.

(2) The film transport unit 5 has been described as an example of photographic sensitive material processing equipment. It is not necessary for the equipment to be provided as a unit. Not only the transport path of film 2 but the transport path of printing paper 3 may also be cleaned.

(3) The hardening treatment need not be provided for the entire area of the elongated cleaning leader 80, but only a leading portion thereof may be hardened. This is because rigidity is required particularly when feeding the leading end of the cleaning leader 80 into the film transport unit 5.

(4) The cleaning cartridge 90 used for storing the cleaning leader 80 is exactly the same as the cartridge 70 for storing the film 2. However, a different cartridge may be used as long as it attachable to the cartridge holder 40 of the film transport unit 5.

Figure 12:
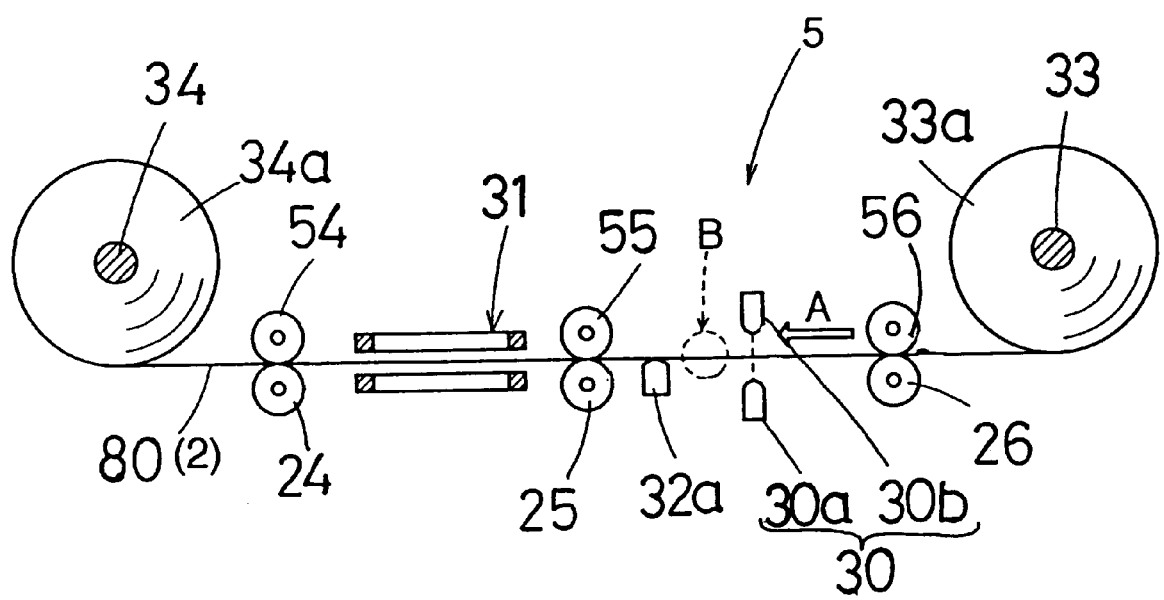
FIG. 12 is a view showing a transport path of the film transport unit.

(5) As shown in FIG. 12, the cleaning leader 80 may be drawn from a roll on a supply shaft 33 at a supply side 33*a* and taken up in a roll on a take-up shaft 34 at a take-up side ³4*a*.

[Second Embodiment]

A second embodiment will be described next with reference to FIGS. 13 through 17. In this embodiment, the cleaning leader 80 has a characteristic configuration.

Figure 14:
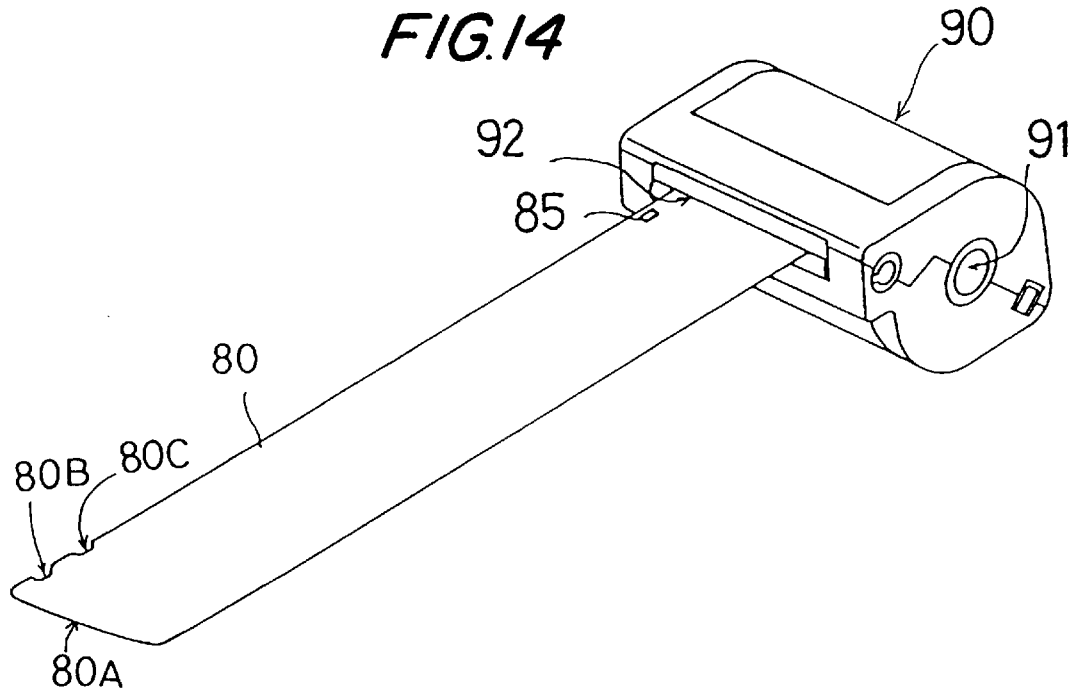
FIG. 14 is a perspective view of a cleaning leader drawn from a cartridge in the second embodiment.

As shown in FIG. 14, the cleaning leader 80 (cleaning member) is stored in the same cartridge as the cartridge 70 storing the film 2. The cleaning leader 80 has an elongated shape as does the film 2, with a width equal to or smaller than the film 2. The cleaning leader 80 need not have the same length as the film 2, but may only have a length necessary for cleaning purposes.

FIGS. 16(a) and (b) are explanatory views showing a difference in outer configuration between the film 2 and cleaning leader 80. As shown in FIG. 16(a), the film 2 has an elongated shape with an inclined end surface 2A formed at the leading end thereof. A cutout 2B is formed adjacent the end surface 2A. As shown in FIG. 16(b), the cleaning leader 80 also has an inclined end surface 80A and a cutout 80B as in the film 2. An additional cutout 80C is formed adjacent the cutout 80B. The cleaning leader 80 further includes an end perforation 85 formed in a rear end region thereof.

Next, an operation of the film transport unit 5 using the above cleaning leader 80 will be described briefly. The film transport unit 5 has the same construction as in the first embodiment.

Figure 13:
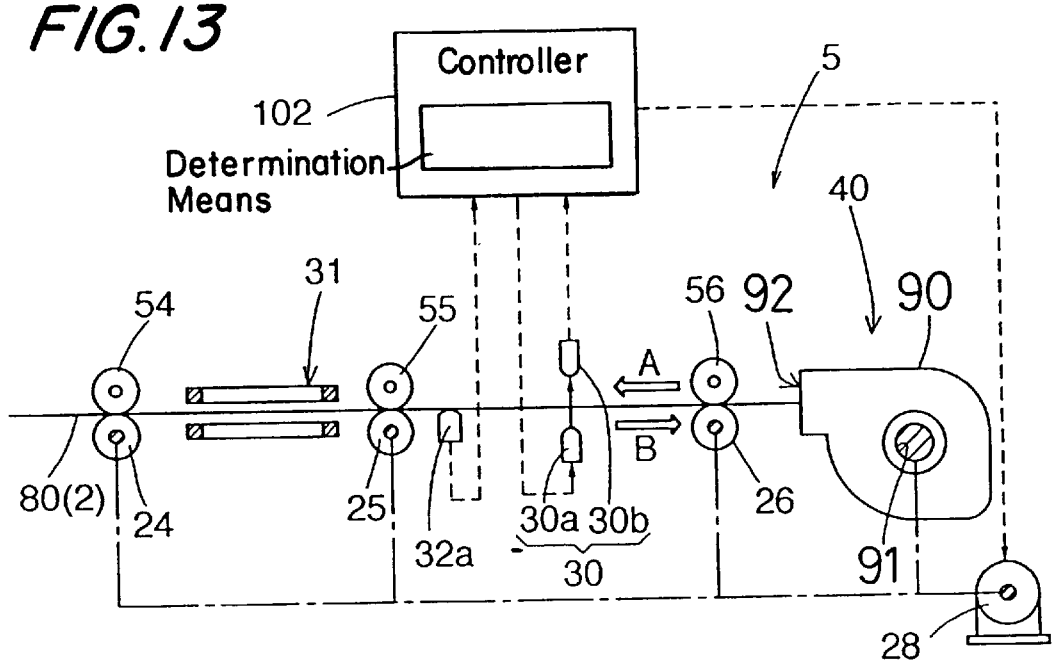
FIG. 13 is a schematic view of a transport path in a second embodiment.
Figure 15:
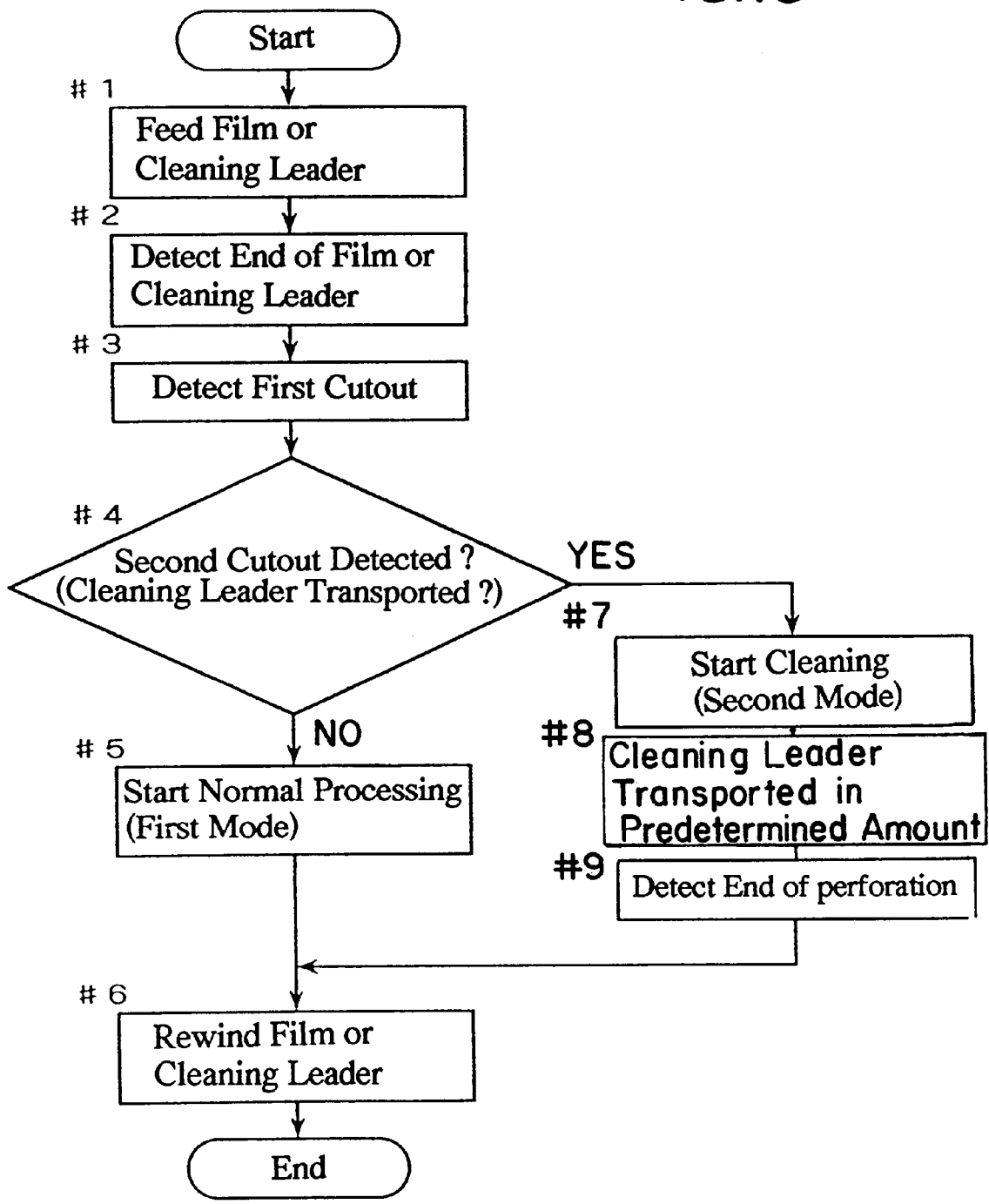
FIG. 15 is a flow chart of an operation of the second embodiment.
Figure 16:
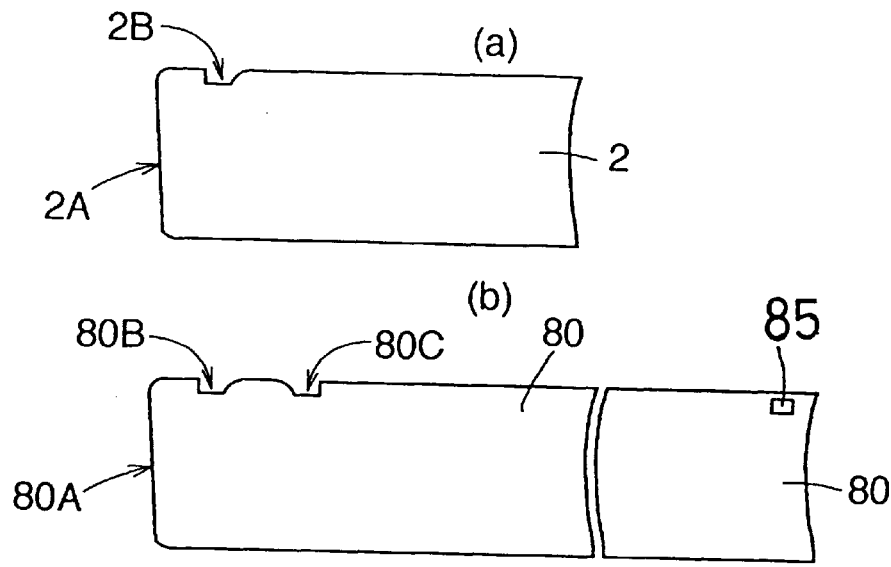
FIGS. 16a, 16b are views for comparing the film and the cleaning leader in the second embodiment.

An operation for effecting a predetermined process of the film 2 (first mode) will be described first. FIG. 15 shows a flowchart of this operation. FIG. 13 schematically shows the transport path described in the first embodiment and illustrated in FIGS. 2 and 3. As seen from FIG. 13, an output signal of the optical sensor 30 is inputted to the controller 102. The spool of the cartridge 70, the drive rollers 24, 25 and 26 and the magnetic heads 32a are controlled by the controller 102.

The cartridge 70 is set to the cartridge holder 40 with the film transport unit 5 opened. After setting the cartridge 70, the film transport unit 5 is closed. Then, the spool of the cartridge 70 is driven in response to a predetermined start signal, whereby the film 2 is drawn from the cartridge 70. The film 2 drawn out is transported by the drive motor 28 in the direction of arrow A in FIGS. 2, 3 and 13 (step #1).

Then, the optical sensor 30 detects the end surface 2A of the film 2 drawn out (step #2). At step #2, the leading end of either the film 2 or the cleaning leader 80 can be recognized, but the leading end of which cannot be determined. After this detection, the film 2 continues to be transported, and the optical sensor 30 detects the cutout 2B (Step #3). Then, it is checked whether or not the second cutout is detected within a predetermined time of the detection of the cutout 2B (Step #4). If the second cutout is detected, it is the cleaning leader 80 that is transported. If no second cutout is detected, it is the film 2 (see FIG. 16(a)). Since no second cutout is detected when the film 2 is transported, a checking device of the controller 102 determines only at step #4 that the film 2 has been transported. After recognizing the film 2 at step #4, the operation moves to step #5. At step #5, a routine process is started for the film 2 (first mode).

In the first mode, the optical sensor 30 reads information optically recorded on the film 2, and the magnetic heads 32a read information from the magnetic recording sections 2b of the film 2, whereby images of the film 2 are exposed and printed onto the printing paper 3. Specifically, while the film 2 is transported in the direction of arrow A, the information corresponding to all frames 2a is read. Then the film 2 is once rewound in the direction of arrow B. The film 2 is transported in the direction of arrow A again, and the exposing device 100 prints the frames 2a of the film 2. When exposing and printing the film 2, the frames 2a of the film 2 are stopped and positioned in the opening 31a for exposure. Upon completion of the film exposure and printing, the film 2 is rewound into the cartridge 70 (step #6).

Next, an operation to clean the transport path in the film transport unit 5 (second mode) will be described.

First, the cartridge 90 containing the cleaning leader 80 is set to the cartridge holder 40 with the film transport unit 5 opened. After setting the cartridge 90, the film transport unit 5 is closed. Subsequently, with a predetermined start signal, the cleaning leader 80 is drawn from the cartridge 90. The cleaning leader 80 drawn out is transported by the drive motor 28 in the direction of arrow A in FIGS. 2, 3 and 13 (step #1).

Then, the optical sensor 30 detects the end surface 80A of the cleaning leader drawn out (step #2). Next, the optical sensor 30 detects the cutout 80B (Step #3). After the cutout 80B is detected, it is checked whether or not the second cutout is detected (Step #4). Since the cleaning leader 80 has the second cutout 80C, the sensor 30 detects it, and the checking device of the controller 102 determines only at step #4 that the cleaning leader 80 has been transported. After recognizing the cleaning leader 80 at step #4, the operation moves to step #7. At step #7, a cleaning operation with the cleaning leader 80 is started. The cleaning leader 80 is drawn out in a predetermined amount (step #8). The cleaning leader 80 is transported through the transport path to clean the magnetic heads in particular. As the cleaning leader 80 is drawn out, the optical sensor 30 detects the end perforation 85 shown in FIG. 16(b) (step #9). After this detection, the cleaning leader 80 is rewound into the cartridge 90.

Modifications of the cleaning leader 80 will be described next.

In the second embodiment, the cleaning leader 80 and film 2 are distinguished by detecting the different configurations thereof. In particular, the cleaning leader 80 is formed to have an elongate shape similar to the film 2, but have the leading end thereof shaped differently from the film 2. In differentiating the shapes of the cleaning leader 80 and film, the cleaning leader 80 may have a different shape or number of holes or cutouts to the film 2. Specific examples will be described with reference to FIG. 17.

FIG. 17(a) shows an example in which a hole (perforation) 80D is formed instead of the cutout. FIG. 17(b) shows an example in which a cutout 80E of increased length is formed. In FIG. 17(c), a cutout 80F is formed farther away from the leading end than the cutout 80B in FIG. 17(b). In this case, the film 2 or cleaning leader 80 may be determined based on a difference in distance or time from detection of the leading end at step #2 to detection of the first cutout at step #3 in FIG. 15.

In FIG. 17(d), a black sheet 80G is applied to enable detection of the cleaning leader 80 based on a difference in reflectivity. FIG. 17(e) shows an example in which a pair of holes 80H are arranged transversely of the direction of transport. FIG. 17(f) shows an example in which a hole 80I is formed in a position transversely opposite to the cutout 80B in FIG. 16(b).

The characteristic feature of the second embodiment lies in that the checking device is provided to determine which of the film 2 and cleaning leader 80 has been transported. The second mode is executed when it is determined that the cleaning leader 80 has been transported.

Thus, switching may be made automatically from the first mode to the second mode and from the second mode to the first mode. As a result, it is unnecessary for the operator to effect manual mode switching, to improve the processing efficiency of photographic processing equipment.

Modified embodiments will be described hereunder.

(1) The processing in the first mode, apart from what has been described in the second embodiment, as the images may be read by a CCD sensor or information may be written by a magnetic head.

(2) The second embodiment has been described with reference to the film 2 used for an advanced photographic system. The invention is of course applicable also to other films such as 135 film. In this case, the cleaning leader 80 may define a notch having a different shape to a notch used for detecting the 135 film. The cleaning leader 80 may define a special hole or cutout or a special bar code in a position corresponding to a DX detector of the 135 film.
The cleaning cartridge 90 used for storing the cleaning leader 80 is exactly the same as the cartridge 70 for storing the film 2. However, a different cartridge may be used as long as it attachable to the cartridge holder 40 of the film transport unit 5.

(3) The cleaning cartridge 90 used for storing the cleaning leader 80 is exactly the same as the cartridge 70 for storing the film 2. However, a different cartridge may be used as long as it attachable to the cartridge holder 40 of the film transport unit 5.

(4) The film transport unit 5 has been described as an example of photographic processing equipment. It is not necessary for the equipment to be provided as a unit. Not only the transport path of film 2 but the transport path of printing paper 3 may also be cleaned.

[Third Embodiment]

A third embodiment will be described next with reference to FIGS. 18 through 25. In this embodiment, the cleaning leader 80 may be used as the wet type.

Figure 21:
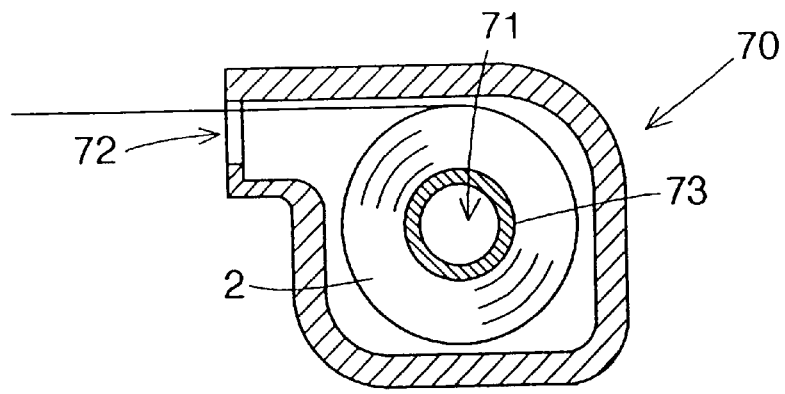
FIG. 21 is a sectional view of a cartridge in the third embodiment.
Figure 22:
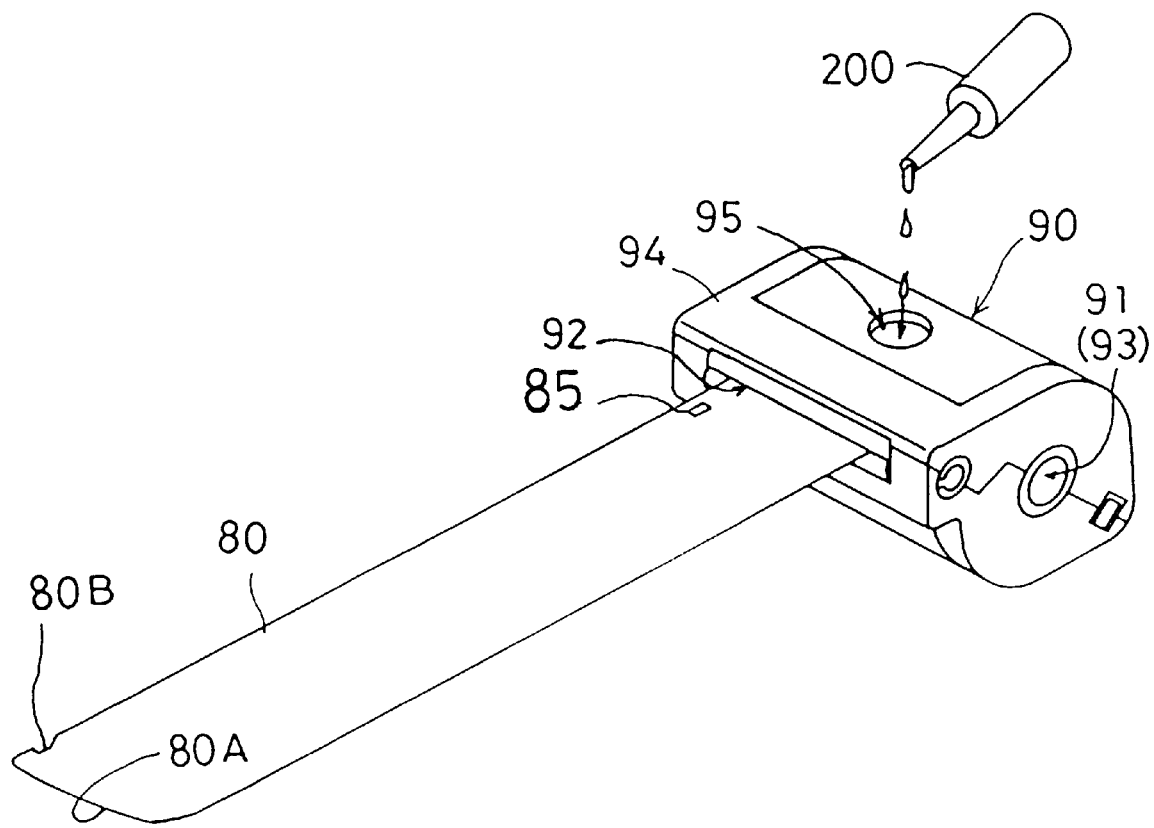
FIG. 22 is a perspective view of a cleaning leader drawn from the cartridge in the third embodiment.
Figure 23:
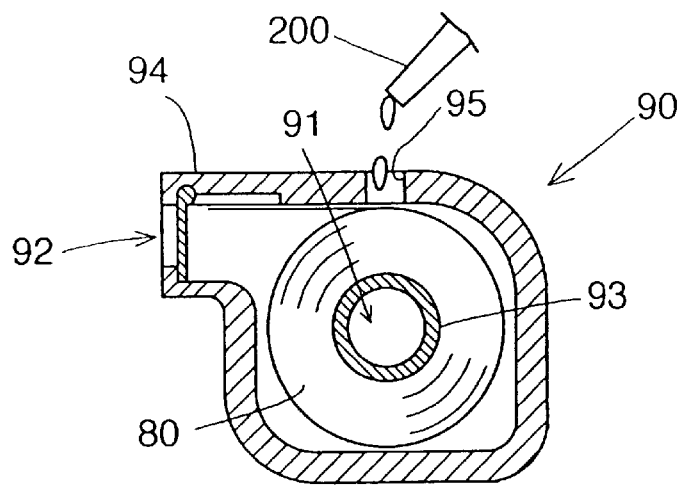
FIG. 23 is a sectional view of the cleaning cartridge in the third embodiment.

As shown in FIGS. 22 and 23, the cleaning leader 80 (cleaning member) is stored in substantially the same cartridge (cleaning cartridge) as the cartridge 70 storing the film 2. The cleaning leader 80 is stored as rolled on a spool 93 mounted in the cartridge 90. The cleaning leader 80 is automatically drawn out through the draw opening 92 by inserting a drive shaft into the bore 91 and rotating the spool 93. FIG. 21 shows a section of the cartridge 70 storing the film 2.

The cleaning leader 80 has an elongated shape as does the film 2, with a width equal to or smaller than the film 2. The cleaning leader 80 need not have the same length as the film 2, but may only have a length necessary for cleaning purposes.

The cartridge 90 has a cover 94 defining an opening 95. The opening 95 is formed for allowing a cleaning solution to be dripped to the cleaning leader 80 stored in the cartridge 90. The cleaning solution has isopropyl alcohol as a main component thereof, and is stored in a container 200. The opening 95 is formed in a position for the cleaning solution to be dripped to a substantially central region transversely of the cleaning leader 80. The position of the opening 95 is not limited to the position shown in FIG. 22, but may be anywhere as long as the cleaning solution may be dripped.

The opening 95 may be formed by cutting the cartridge 70 of the film 2, but cutting dust may be produced to enter the cartridge 90. It is therefore desirable to form the opening 95 by heating rather than by cutting. Though not shown, a label is applied to a surface of the cartridge 90 to check the number of cleaning times.

An outward form of cleaning leader 80 is shown in FIG. 22. The cleaning leader 80 is basically the same as the one described earlier with reference to FIG. 14.

A material suited to the cleaning leader 80 may be a synthetic fiber (product name: Savina Minimax) impregnated with a resin as described with reference to FIGS. 4 through 7. The material has excellent water absorptive and retentive features, may be used selectively as the "wet type" or "dry type" according to a soiled degree of magnetic heads. Since hyperfine fibers are employed, the cleaning solution may penetrate a wide range within a short time through capillary action.

Figure 17:
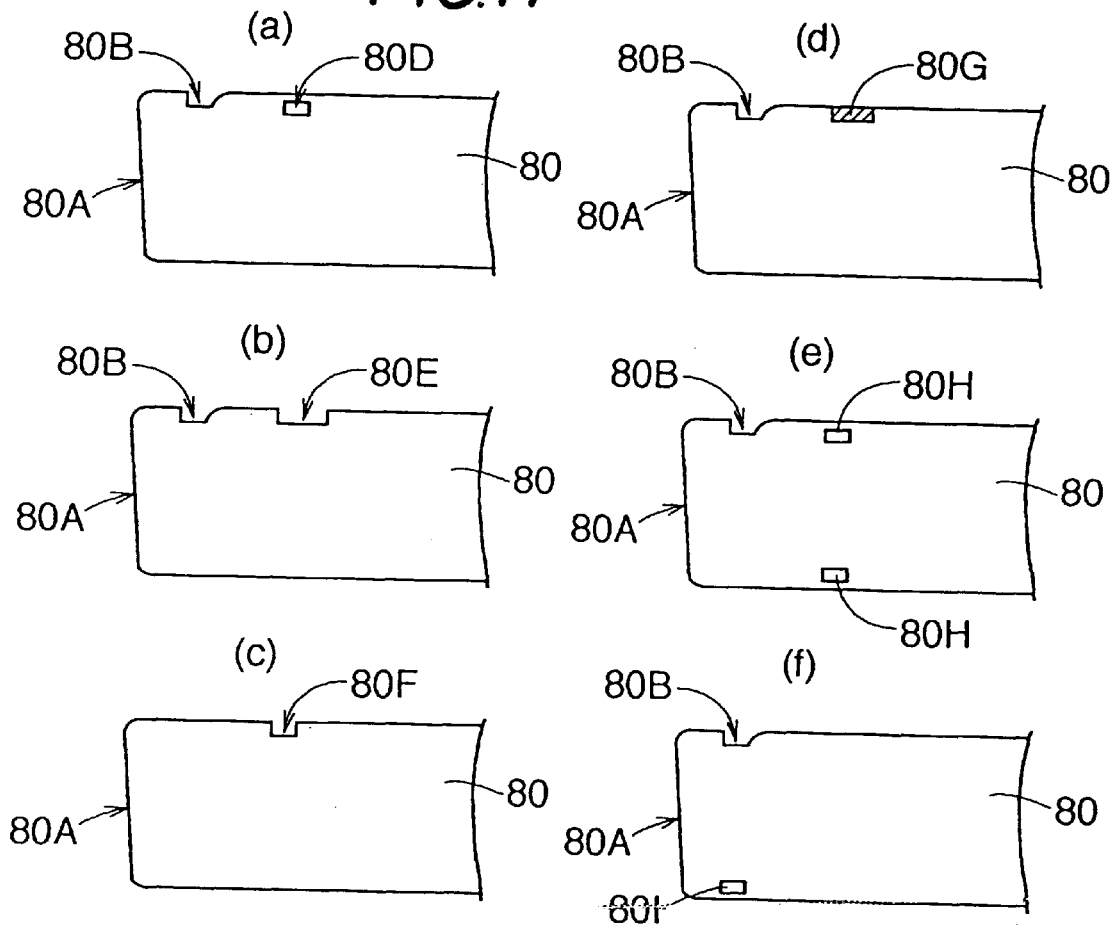
FIGS. 17a–17f are views showing a modification of the cleaning leader in the second embodiment.

The makeup of cleaning leader 80 will be described briefly with reference to FIG. 17. FIG. 17 shows a section of the cleaning leader 80. The cleaning leader 80 is formed of a synthetic fiber 81 and a resin 82 impregnating the synthetic fiber 81. The synthetic fiber 81 defines a surface 81*a* to which the cleaning solution is dripped for use as a cleaning surface. The resin 82 defines a surface 82*a* not used for cleaning.

Figure 18:
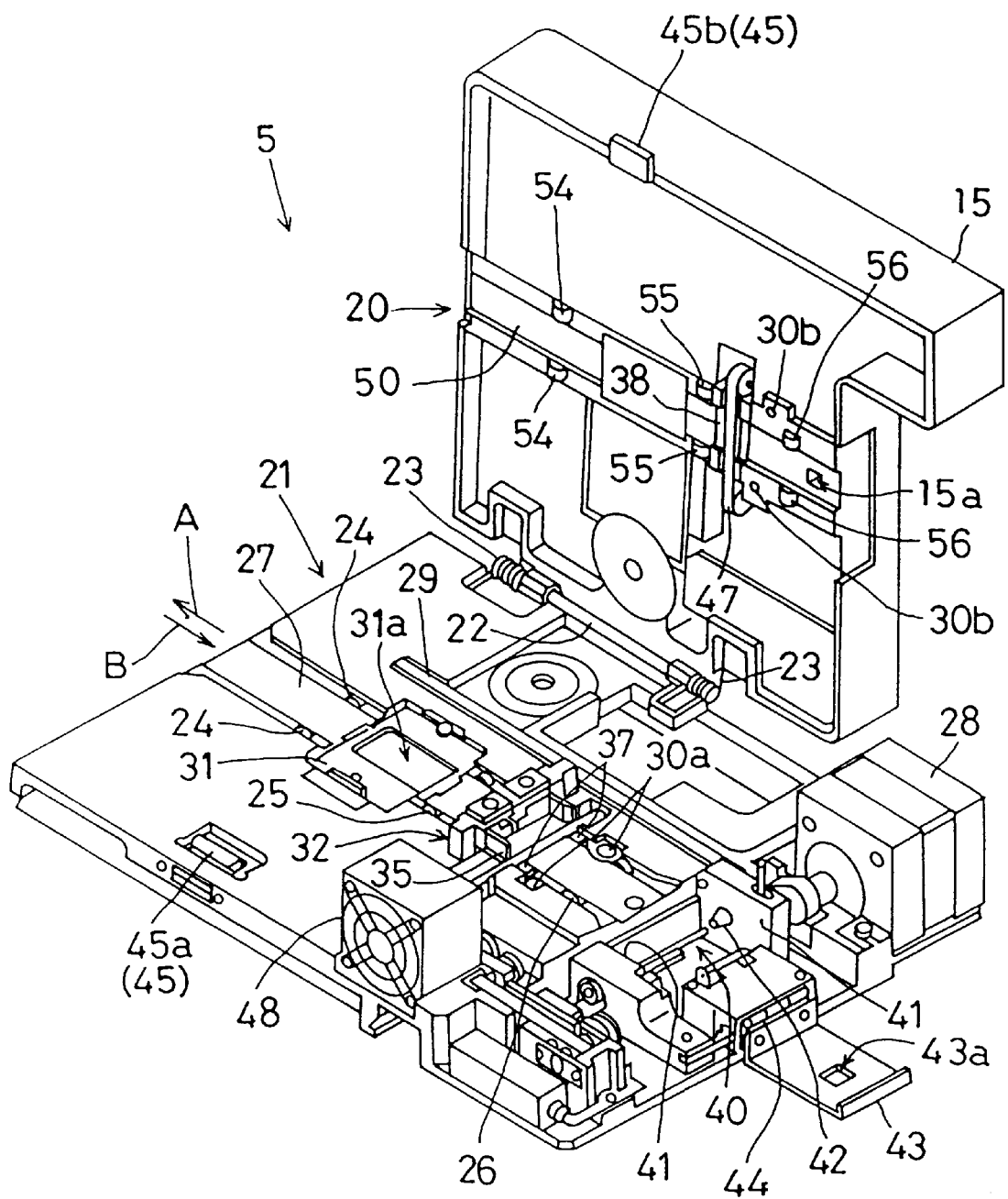
FIG. 18 is a perspective view of a film transport unit in a third embodiment.
Figure 19:
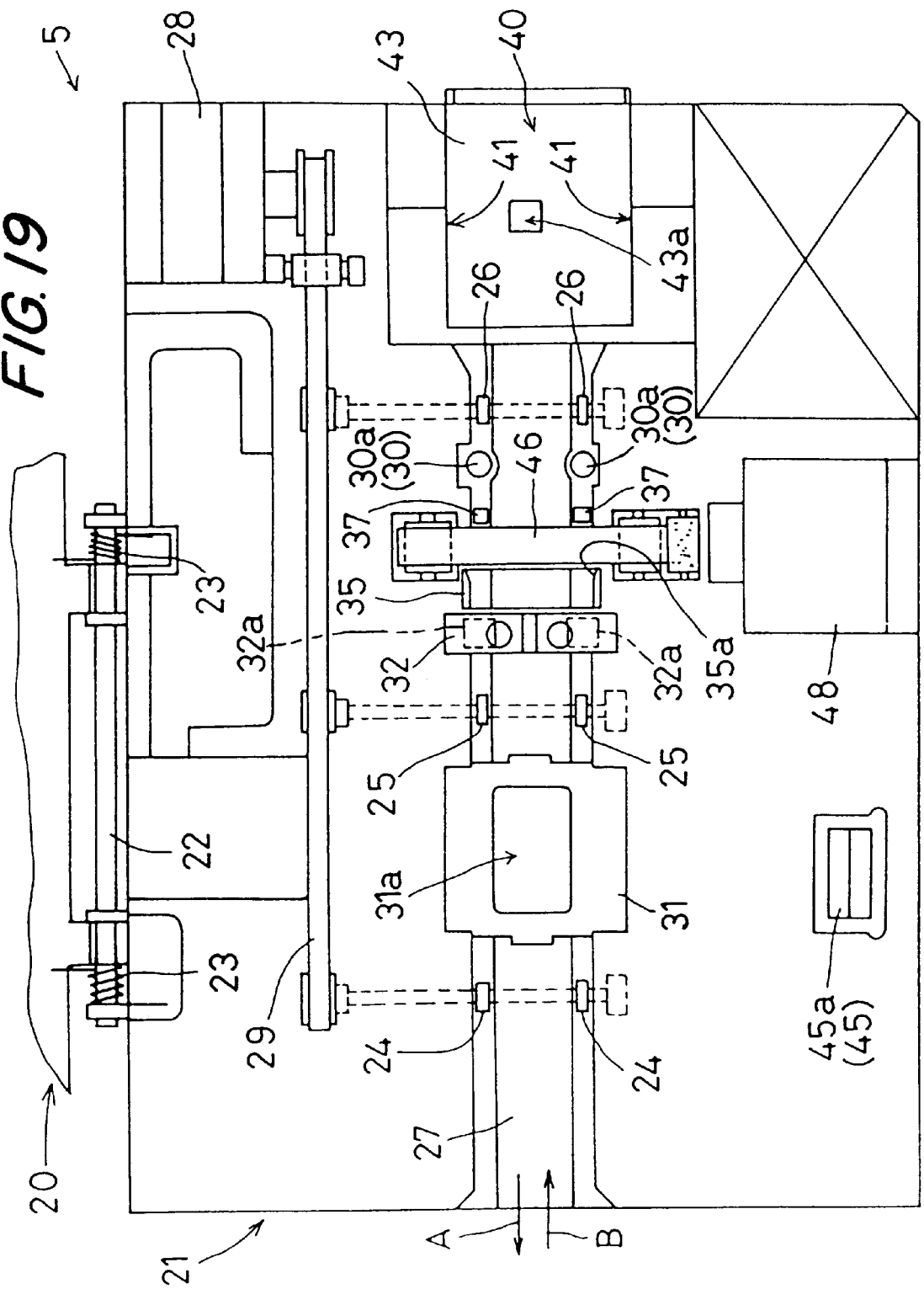
FIG. 19 is a plan view of the film transport unit in the third embodiment.
Figure 20:
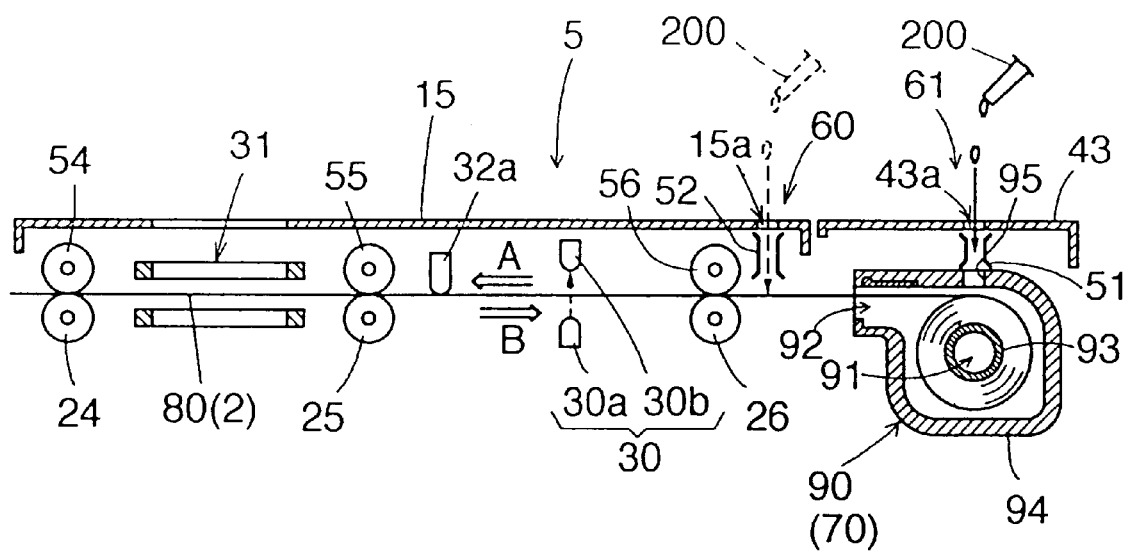
FIG. 20 is a schematic view of a transport path in the third embodiment.

The components of the photographic printing apparatus 1 have already been described with reference to FIG. 1, and will not be described again. FIGS. 18 through 20 show a film transport unit 5 used in the third embodiment. Most aspects of its construction are the same as in the first embodiment shown in FIGS. 2 and 3. Only different aspects will be described hereinafter.

As shown in FIGS. 18 and 20, solution guides 60 and 61 are provided to guide the cleaning solution dripping from the container 200 to the cleaning leader 80. These figures show the two solution guides 60 and 61 for expediency, but only one may be provided in practice.

One of the solution guides 60 includes an opening 15*a* formed in a cover 15 of the upper unit 20, and a guide element 52 for guiding the cleaning solution from the openings 15*a* to the surface of the cleaning leader 80. The guide element 52, which is not an essential element, is provided to prevent the cleaning solution from adhering to the transport rollers and detectors. The other solution guide 61 also includes an opening 43*a* and a guide element 51 formed in/on the lid 43.

Figure 24:
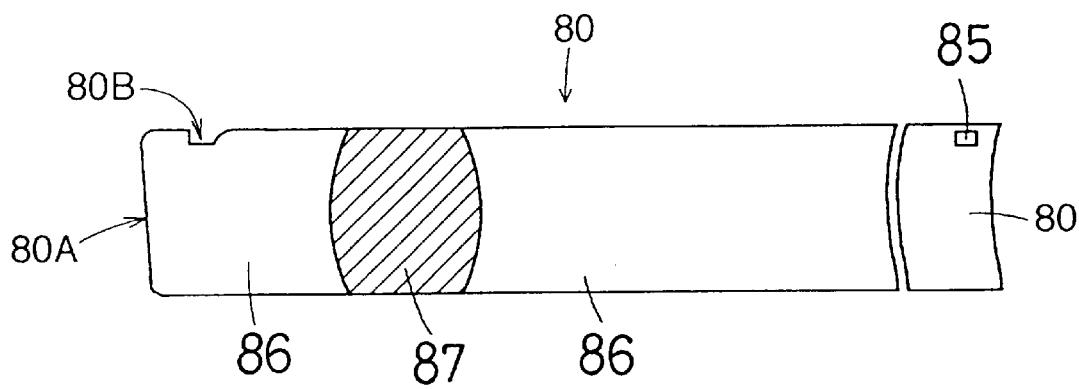
FIG. 24 is a view showing penetration of a cleaning solution.
Figure 25:
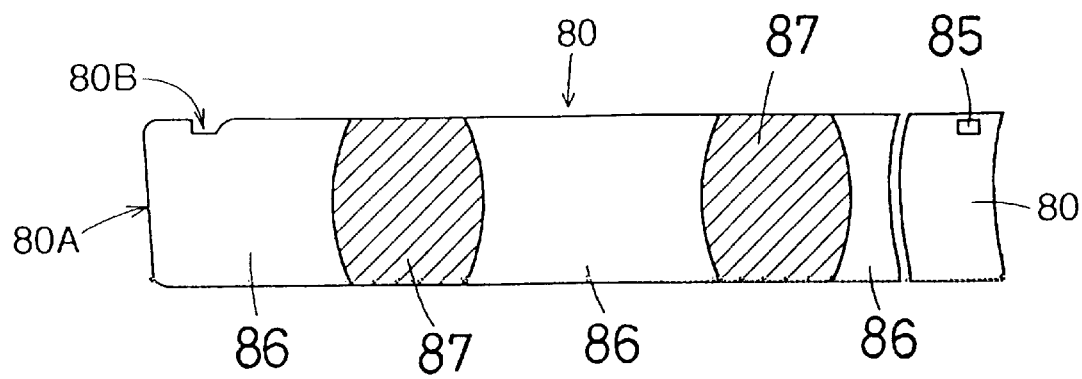
FIG. 25 is another view showing penetration of the cleaning solution.

The state of the cleaning leader 80 with the cleaning solution applied thereto will be described next. As shown in FIG. 24, when the cleaning solution dripped with only the leading end of the cleaning leader 80 drawn from the cartridge 90, a dry region 86, a wet region 87 and a dry region 86 are formed successively from the leading end. When the cleaning solution is dripped through the opening 95 in the cartridge 90 as shown in FIG. 23, dry regions 86 and wet regions 87 are formed alternately as shown in FIG. 25. This is because the cleaning solution penetrates to inner layers when dripped to the cleaning leader 80 wound around the spool 93.

Next, an operation of the above film transport unit 5 will be described briefly. An operation for effecting a predetermined process of the film 2 will be described first. FIG. 20 schematically shows the transport path illustrated in FIGS. 18 and 19. An output signal of the optical sensor 30 is inputted to the controller 102. The spool of the cartridge 70, the drive rollers 24, 25 and 26 and the magnetic heads 32*a* are controlled by the controller 102.

The cartridge 70 is set to the cartridge holder 40 with the film transport unit 5 opened. After setting the cartridge 70, the film transport unit 5 is closed. Then, the spool of the cartridge 70 is driven in response to a predetermined start signal, whereby the film 2 is drawn from the cartridge 70. The film 2 drawn out is transported by the drive motor 28 in the direction of arrow A in FIGS. 18, 19 and 20 to effect a routine process on the film 2.

That is, the optical sensor 30 reads information optically recorded on the film 2, and the magnetic heads 32*a* read information from the magnetic recording sections 2*b* of the film 2, whereby images of the film 2 are exposed and printed onto the printing paper 3. Specifically, while the film 2 is transported in the direction of arrow A, the information corresponding to all frames 2a is read. Then the film 2 is once rewound in the direction of arrow B. The film 2 is transported in the direction of arrow A again, and the exposing device 100 prints the frames 2a of the film 2. When exposing and printing the film 2, the frames 2a of the film 2 are stopped and positioned in the opening 31a for exposure. Upon completion of the film exposure and printing, the film 2 is rewound into the cartridge 70.

Next, an operation to clean the transport path in the film transport unit 5 will be described.

First, the cartridge 90 containing the cleaning leader 80 is set to the cartridge holder 40 with the film transport unit 5 opened. Subsequently, the cleaning solution is dripped through the opening 43a in the lid 43. The cleaning solution drips through the opening 95 formed in the cartridge 90 to permeate the cleaning leader 80, to be ready for wet cleaning. The cleaning solution may be supplied through the opening 95 before setting the cartridge 90 to the cartridge holder 40. After setting the cartridge 90, the film transport unit 5 is closed. Subsequently, with a predetermined start signal, the cleaning leader 80 is drawn from the cartridge 90. The cleaning leader 80 drawn out is transported by the drive motor 28 in the direction of arrow A in FIGS. 18, 19 and 20.

Then, a cleaning operation with the cleaning leader 80 is started. The cleaning leader 80 is drawn out in a predetermined amount. The cleaning leader 80 is transported through the transport path to clean the magnetic heads in particular. As shown in FIG. 24 or 25, the cleaning leader 80 includes the dry regions 86 and wet regions 87. After dry cleaning with the first dry region 86, wet cleaning is done with the next wet region, and then dry cleaning is done again. In this way, the wet region 87 dissolves dirt on the magnetic heads 32a, and the dry region 86 wipes off the dirt, to realize effective cleaning.

As the cleaning leader 80 is fed, the optical sensor 30 detects the end perforation shown in FIG. 22. After this detection, the cleaning leader 80 is rewound into the cartridge 90 to complete the cleaning operation.

The cleaning solution may be supplied by using the opening 15a formed in the cover 15. Specifically, the cleaning leader 80 is drawn in a predetermined amount in response to a predetermined start signal, and then the transport of the cleaning leader 80 is stopped. In this state, the cleaning solution may be dripped through the opening 15a.

[Fourth Embodiment]

A fourth embodiment will be described next. A film transport unit 5 in this embodiment will be described with reference to FIGS. 26 through 29.

This film transport unit 5 includes an exposing device 100 for exposing and printing images of a film 2, and a scanner 105 for reading image information from the film 2. This construction may be said a combination of two of the film transport unit 5 shown in FIG. 18. The exposing device 100 has the same construction a shown in FIG. 1 (c.f. the description of the first embodiment). Like parts are affixed with like reference numerals, and their description will not be repeated. The scanner 105 includes a scanner light source 16, a mirror tunnel 17, a reflecting mirror 18 and a CCD camera 19.

The components of the film transport unit 5 are supported on a base 501. A turn table 502 is mounted centrally of the base 501 to be rotatable clockwise in FIG. 26. Cartridge mounts 503 and cartridge drivers 504 are arranged in four positions circumferentially of the turn table 502. A cartridge feeder 505 is disposed in a peripheral position of the turn table 502 for supplying cartridges 70 and 90. A cover 506 is provided to cover substantially an entire area of the base 501 (FIG. 27). A motor 507 is disposed under the center of the turn table 502 for driving the turn table 502.

Figure 28:
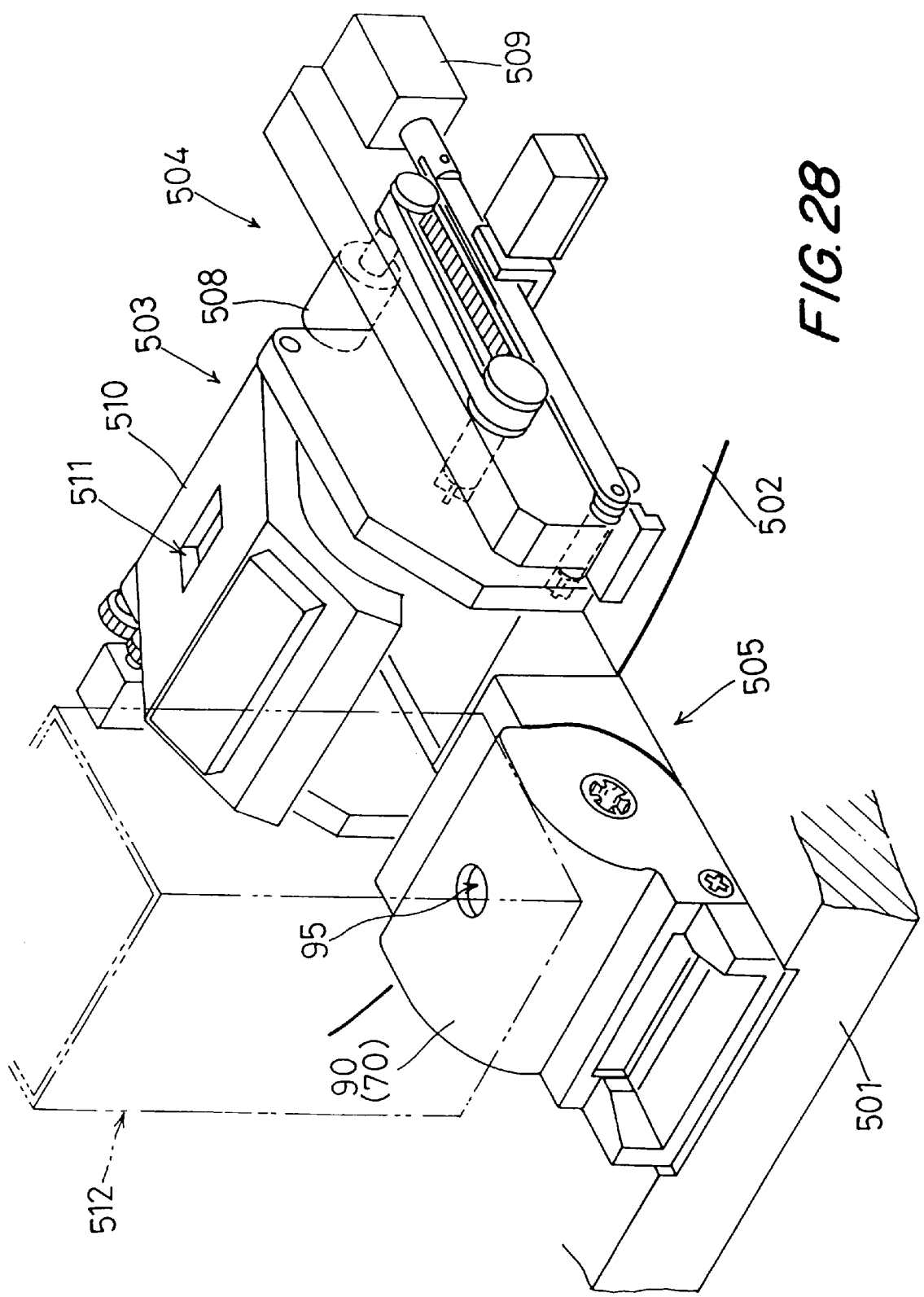
FIG. 28 is an enlarged perspective view of a cartridge feeder in the fourth embodiment.
Figure 29:
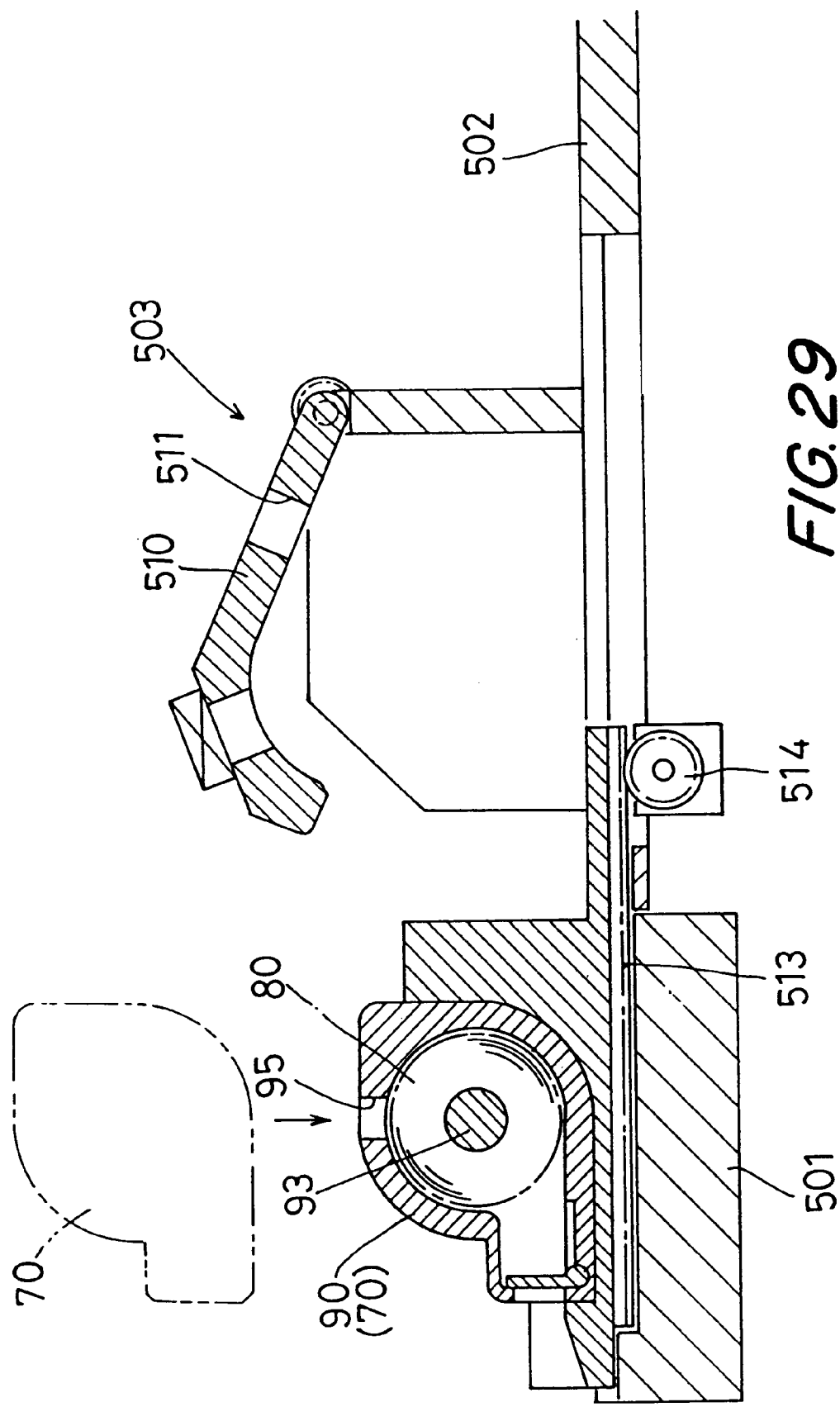
FIG. 29 is a sectional view of the cartridge feeder in the fourth embodiment.

As shown in details in FIG. 28, each cartridge driver 504 includes a motor 508 for drawing or rewinding the film 2 or cleaning leader 80 from/into the cartridge 70 or 90, and a solenoid 509 for opening light locks of the cartridges 70 and 90. As shown in FIGS. 28 and 29, each cartridge mount 503 has a pivotable lid 510. An opening 511 is formed in the lid 510 for allowing a cleaning solution to be dripped therethrough. The cartridge feeder 505 includes a tubular case 512 for storing the cartridges 70 and 90 arranged vertically. The cartridges 70 and 90 falling from the case 512 are fed to the cartridge mount 503 by a rack 513 and pinion 514.

As shown in FIG. 27, the scanner 105 includes transport rollers 63, 64 and 65, an optical sensor 66 and a reading magnetic head 67 arranged along a transport path thereof. A take-up device 68 is disposed at a terminal end of the transport path for temporarily taking up the film 2 or cleaning leader 80.

Similarly, the exposing device 100 includes transport rollers 74, 75 and 76, an optical sensor 77, a writing magnetic head 78 and a take-up device 79 arranged along a transport path thereof.

The scanner 105 has a cover 506 defining an opening 515 and a guide element 516 constituting a solution guide similar to that in the first embodiment.

An operation of the film transport unit 5 will be described next.

Cartridges 70 storing films 2 and cartridges 90 storing cleaning leaders 80 are supplied in series from the cartridge feeder 505 to the film transport unit 5.

To carry out cleaning operations at regular intervals, one cleaning cartridge 90 may be mixed with every predetermined number of film cartridges 70.

Figure 26:
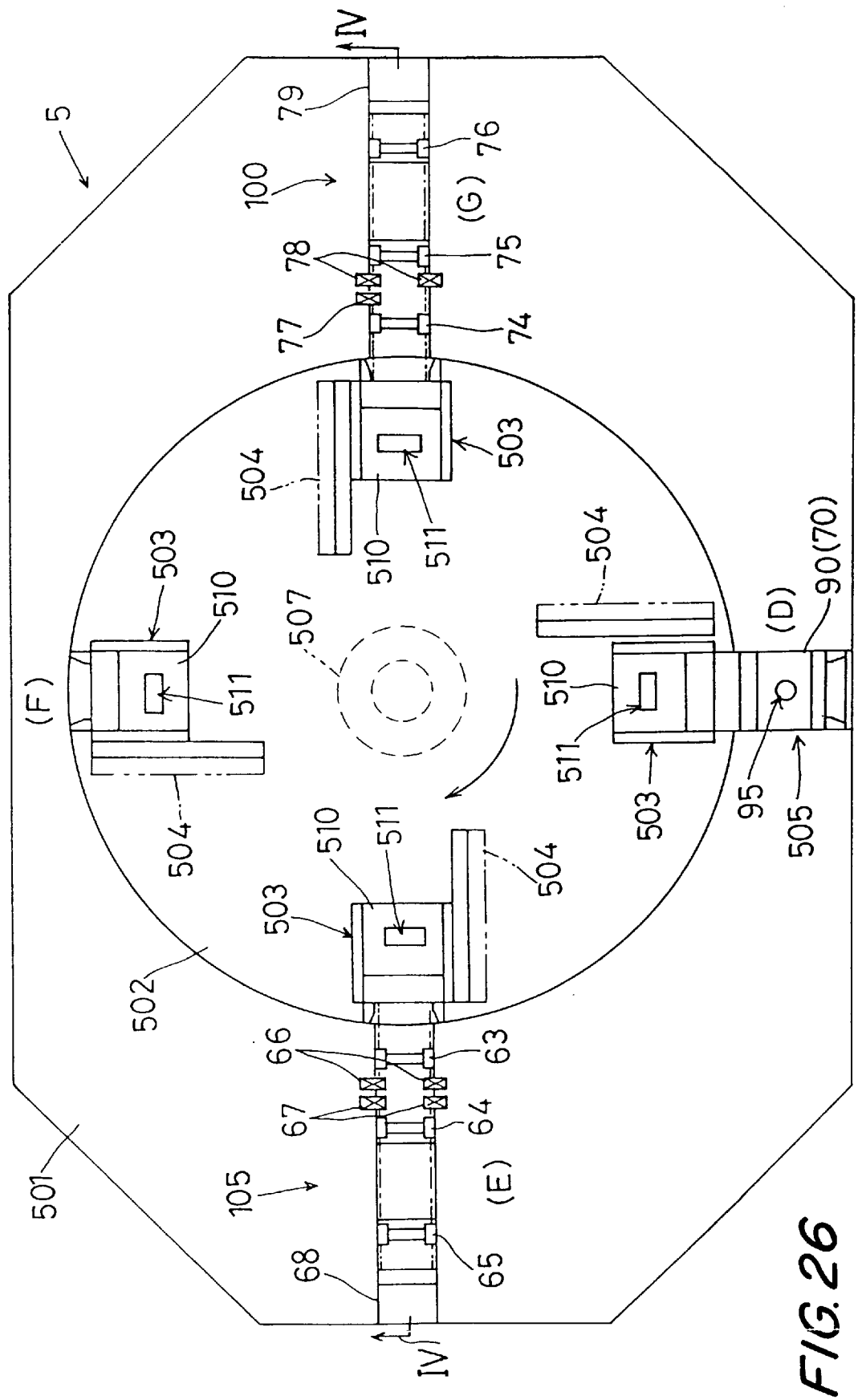
FIG. 26 is a plan view of a film transport unit in a fourth embodiment.
Figure 27:
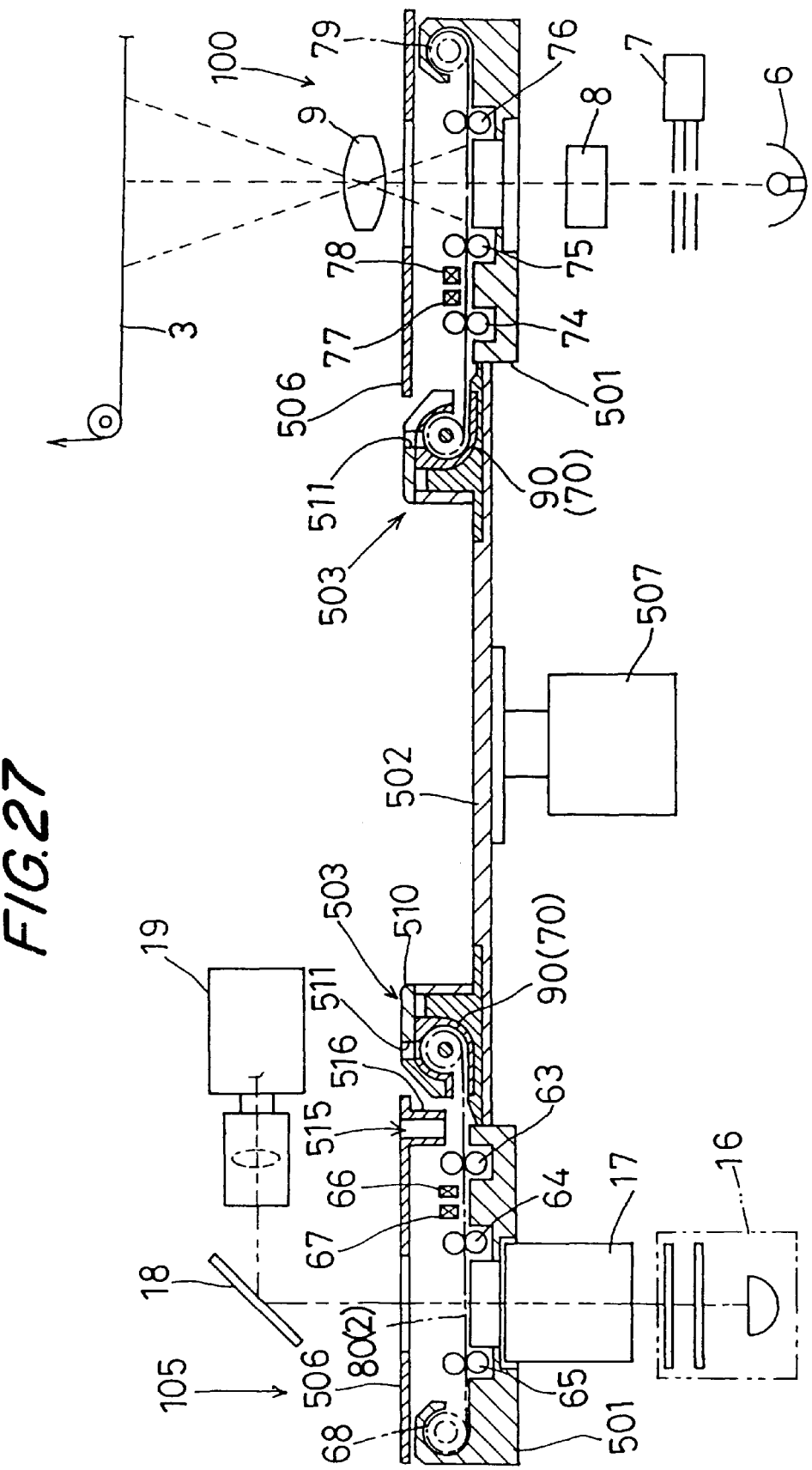
FIG. 27 is a section taken on line IV—IV of FIG. 26.

First, in a position (D) in FIG. 26, cartridge 70 or 90 is transferred from the cartridge feeder 505 to one of the cartridge mounts 503. This transfer is done by the pinion 513 and rack 514. When the transfer to the cartridge mount 503 is completed, the lid 510 is closed. Subsequently, the turn table 502 is rotated 90-° clockwise to a position (E), i.e. to the scanner 105, in FIG. 26. Then, the image information and magnetic information are read from the film 2, or the transport path is cleaned with the cleaning leader 80. The transport control is the same as in the third embodiment, and will not be described again.

When the processing in the scanner 105 is completed, the cartridge 70 or 90 is transferred by the turn table 502 via a position (F) to a position (G), i.e. to the exposing device 100, shown in FIG. 26. Then, the image information of the film 2 is printed and magnetic information written on the film 2, or the transport path is cleaned with the cleaning leader 80. The transport control is the same as in the third embodiment, and will not be described again. When the processing in the exposing device 100 is completed, the cartridge 70 or 90 is returned by the turn table 502 to the cartridge feeder 505 to be discharged.

The timing of supplying the cleaning solution in this embodiment is basically the same as in the third embodiment. However, since the cartridges 70 and 90 are handled automatically from feeding to discharge thereof, it is preferable from the point of operating efficiency to feed the cartridge 90 supplied with the cleaning solution in advance. Taking evaporation of the cleaning solution into account, the cleaning solution may be supplied through the opening 511 or opening 515 immediately before a cleaning operation.

[Modified Cartridges]

Figure 30:
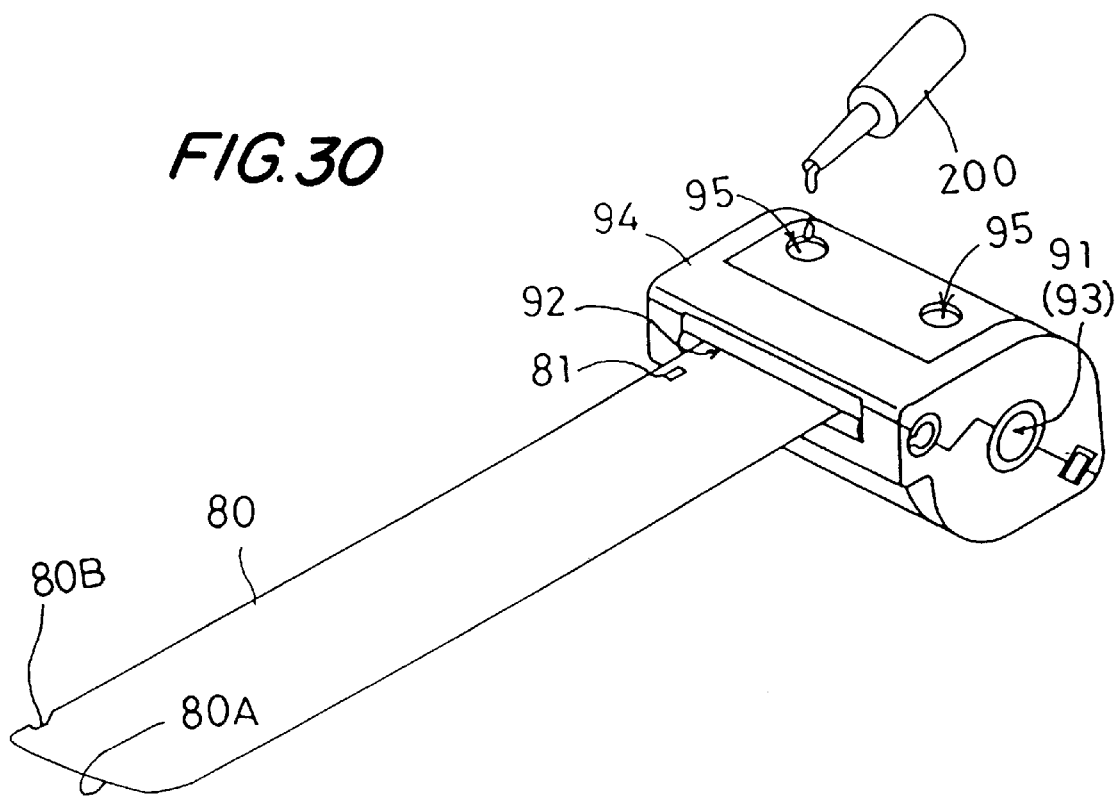
FIG. 30 is a perspective view of a modified cleaning cartridge.
Figure 31:
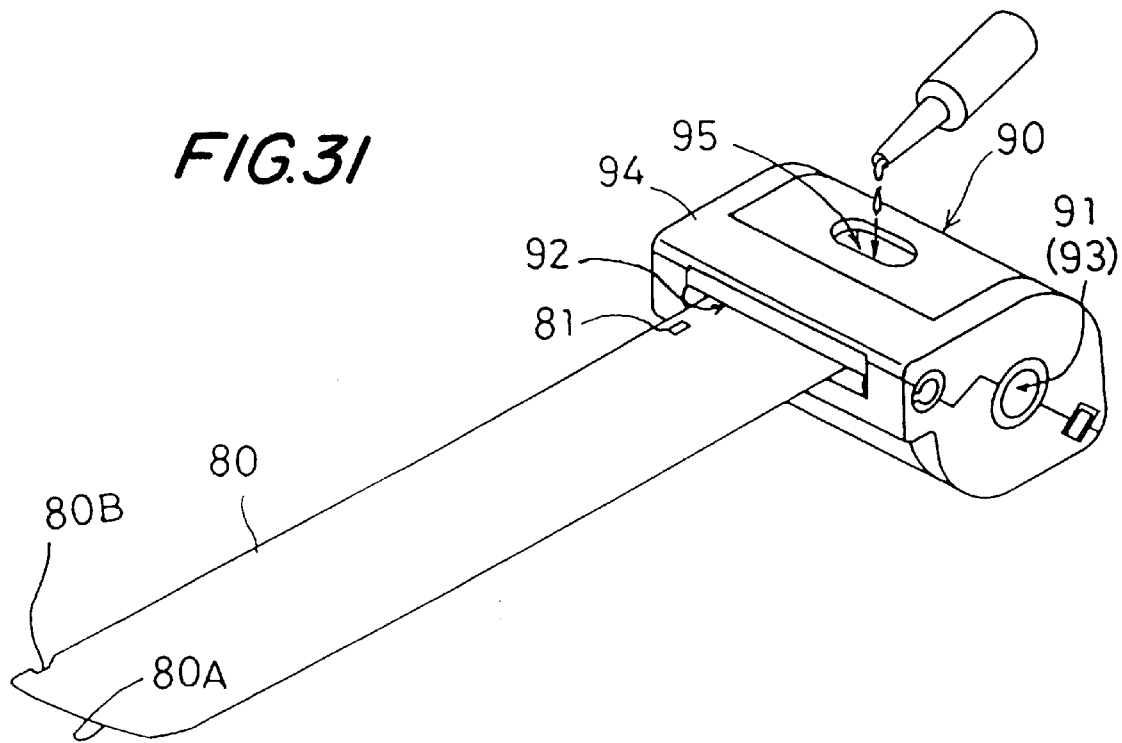
FIG. 31 is a perspective view of another modified cleaning cartridge.
Figure 32:
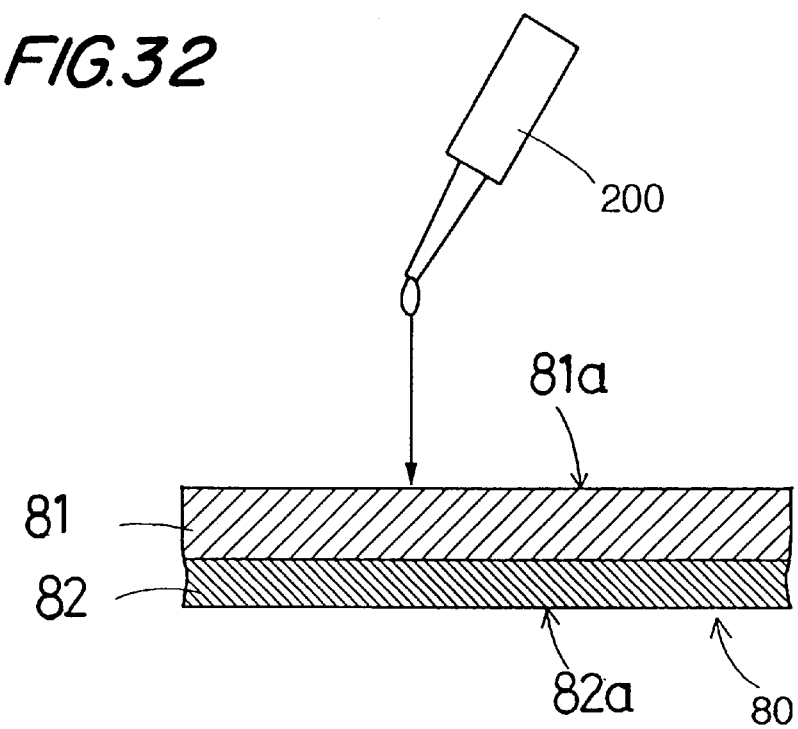
FIG. 32 is a view showing a structure of a cleaning leader.

FIGS. 30 and 31 show modifications of the cleaning cartridge 90.

In FIG. 30, openings 95 are formed in two positions spaced apart transversely of the cleaning leader 80. These positions of openings 95 are set to correspond to the magnetic recording sections 2b of the film 2. This arrangement is based on the consideration that particularly the magnetic head among the components on the transport path tends to become dirty, or that it is the most important to remove dirt from the magnetic head.

In FIG. 31, an opening 95 is formed in one, central position, it is a slot extending transversely of the cleaning leader 80. With this construction, the cleaning solution may be supplied evenly over an entire area transversely of the cleaning leader 80.

[Modified Cleaning Leaders]

Figure 33:
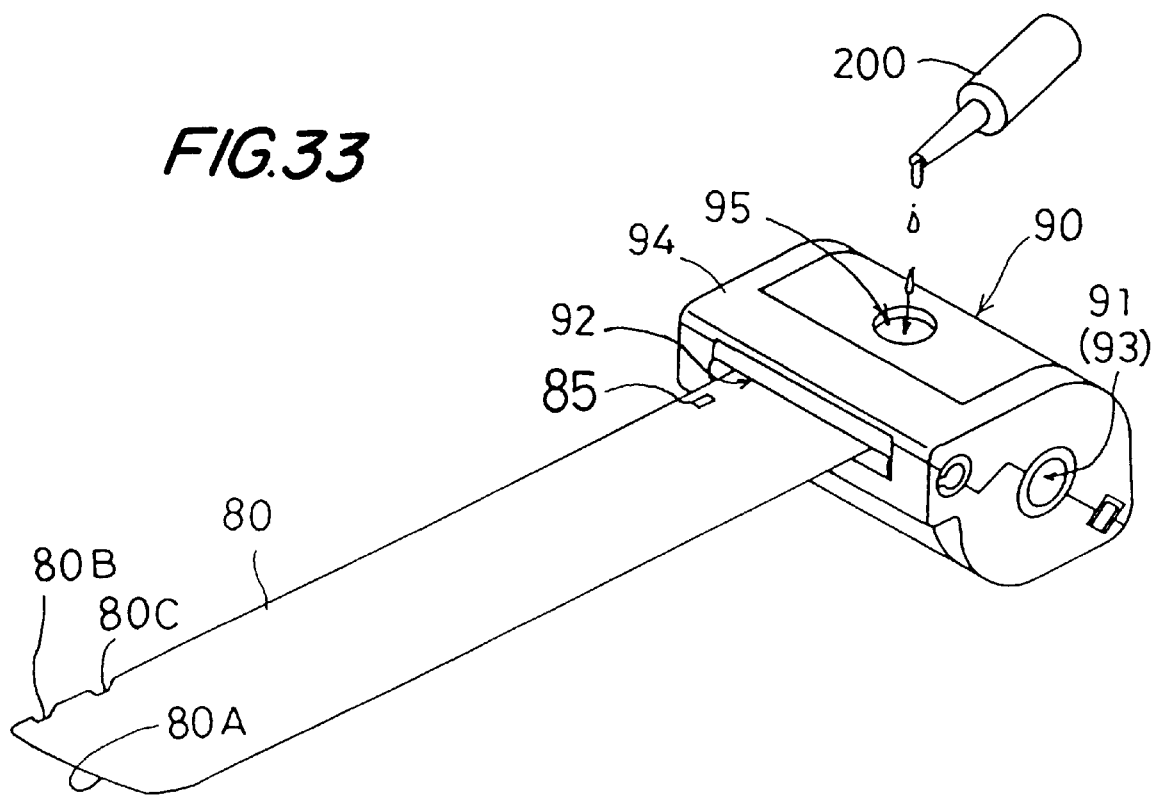
FIG. 33 is a perspective view of a further modified cleaning cartridge.

A modified cleaning leader 80 is shown in FIG. 33. This cleaning leader 80 is different from the embodiment of FIG. 22 is that a cutout 80C is formed in addition to the cutout 80B. That is, two cutouts 80B and 80C are formed in a leading end region of the cleaning leader 80. On the other hand, as shown in FIG. 10, the film 2 has one cutout 2B formed in the leading end region thereof. Thus, by detecting the number of cutouts with an optical sensor or the like, it is possible to distinguish between the film 2 and cleaning leader 80, thereby enabling automation of the cleaning operation.

[Other Embodiments]

(1) In this embodiment, the cleaning leader 80 as contained in the cartridge 90 is transferred to the film transport unit 5. However, the cleaning leader 80 may be attached without the cartridge 90.

(2) In this embodiment, the cleaning solution is dripped directly to the cleaning member. The cleaning solution may be applied through a felt. The cartridge 90 or film transport unit 5 may include a liquid sump for storing the cleaning solution.

(3) In this embodiment, the cleaning solution is supplied to the film transport unit 5. Where a component having the same function as the film transport unit 5 is incorporated into and fixed in the photographic printing apparatus 1, a body cover of the photographic printing apparatus 1 may include a solution guide for allowing the cleaning solution to be supplied from outside the body cover.

What is claimed is:

1. A method of cleaning photographic sensitive material processing equipment comprising the steps of:

transporting a cleaning leader through a transport path of the photographic sensitive material processing equipment, the cleaning leader having an impregnated surface impregnated with a resin for increased rigidity required for allowing the cleaning leader to be transported in the same way as a photographic film and a cleaning surface not impregnated with resin;

wherein said resin-impregnated surface comprises wiping cloth formed of warps and yarns having a thickness-wise portion thereof impregnated with the resin, the remaining thickness-wise portion thereof not impregnated with the resin forming said cleaning surface.

2. A cleaning method as defined in claim 1, wherein said synthetic fiber is hardened by being impregnated with a resin selected from urethane resin, acrylic resin and silicone resin.

3. A cleaning method as defined in claim 1, wherein said cleaning leader is elongated to be an identical or similar shape to a film transported through said photographic sensitive material processing equipment.

4. A cleaning method as defined in claim 1, wherein at least a leading end of said cleaning leader is hardened.

5. A cleaning method as defined in claim 1, wherein said cleaning leader is stored in a cartridge.

6. A cleaning cartridge for use in a method of cleaning photographic sensitive material processing equipment as defined in claim 1, comprising a cleaning leader formed of a synthetic fiber hardened with a resin.

7. A cleaning material for cleaning photographic sensitive material processing equipment, comprising:

an impregnated surface impregnated with a resin for increased rigidity required for allowing the material to be transported in the same way as a photographic film; and a cleaning surface not impregnated with resin;

wherein said resin-impregnated surface comprises a wiping cloth formed of warps and yarns having a thickness-wise portion thereof impregnated with the resin, the remaining thickness-wise portion thereof not impregnated with the resin forming said cleaning surface.

8. A cleaning material as defined in claim 7, wherein said synthetic fiber is hardened by being impregnated with a resin selected from urethane resin, acrylic resin and silicone resin.

9. A cleaning material as defined in claim 8, further comprising an additive added to said resin.

10. A cleaning material as defined in claim 9, wherein said additive is an antistatic agent or a pigment.

11. A cleaning member recognition system for photographic processing equipment, comprising:

control means for selectively executing a first mode to transport a photographic film along a transport path and provide a predetermined process therefor, and a second mode to transport a cleaning member along said transport path and clean said transport path; and determination means for determining which of said photographic film and said cleaning member is transported, said determination means including a hole or a cutout defined in said cleaning member, said hole or cutout being different in shape from a hole or a cutout defined in the photographic film;

wherein said control means selects and executes said second mode when said cleaning member is transported.

12. A cleaning member recognition system as defined in claim 11, wherein said cleaning member has a different shape to said photographic film, said cleaning member being identified by detecting said different shape.

13. A cleaning member recognition system as defined in claim 12, wherein said cleaning member is elongated to be similar to said photographic film, and has a leading end region having a different shape to said photographic film.

14. A cleaning member recognition system as defined in claim 12, wherein said photographic film has a hole or cutout formed therein, and said cleaning member has a different number of holes or cutouts.

15. A cleaning member recognition system as defined in claim 12, wherein said photographic film has a hole or cutout formed therein, and said cleaning member has a hole or cutout of different shape thereto.

16. A cleaning member recognition system as defined in claim 11, wherein said cleaning member is stored in a cartridge identical to a cartridge for storing said photographic film.

17. A cleaning member for use in a cleaning member recognition system as defined in claim 11, wherein said cleaning member is elongated to be similar to said photographic film, and has a leading end region having a different shape to said photographic film.

18. Photographic sensitive material processing equipment for transporting a photographic sensitive material along a transport path and providing a predetermined process therefor, comprising:

holder means for holding a cleaning member to be transported along said transport path; and solution guide means for introducing a cleaning solution to said cleaning member mounted in said holder means.

19. Photographic sensitive material processing equipment as defined in claim 18, wherein said solution guide means includes a first opening formed a cover for covering said transport path or said holder means.

20. Photographic sensitive material processing equipment as defined in claim 18, wherein said cleaning member is mounted in said holder means, as stored in a cleaning cartridge having an identical or similar shape to a cartridge for storing said photographic sensitive material.

21. Photographic sensitive material processing equipment as defined in claim 20, wherein said first opening is formed in a position for supplying said cleaning solution to a leading end region of said cleaning member drawn from said cleaning cartridge.

22. Photographic sensitive material processing equipment as defined in claim 20, wherein said cleaning cartridge defines a second opening for supplying said cleaning solution, said first opening being formed in a position above said second opening when said cleaning cartridge is mounted in said holder means.

23. A method of cleaning photographic sensitive material processing equipment for transporting a photographic sensitive material along a transport path and providing a predetermined process therefor, comprising the steps of:

supplying a cleaning solution to a cleaning member before or after said cleaning member is mounted in a holder included in said photographic sensitive material processing equipment; and transporting said cleaning member along said transport path to clean said transport path.

24. A method of cleaning photographic sensitive material processing equipment as defined in claim 23, wherein said cleaning solution is dripped to part of said cleaning member, thereby forming wet regions permeated by said cleaning solution, and dry regions free of said cleaning member, said wet regions being used in cleaning first and then said dry regions being used in cleaning.

25. A cleaning cartridge for storing a cleaning member for cleaning photographic sensitive material processing equipment, comprising an opening for supplying a cleaning solution to said cleaning member in a stored state.

26. A cleaning cartridge as defined in claim 25, wherein said cleaning member has an identical or similar shape to a photographic sensitive material, said opening being formed in a position for supplying said cleaning solution to a middle region transversely of said cleaning member.

* * * * *

UNITED STATES PATENT AND TRADEMARK OFFICE
CERTIFICATE OF CORRECTION

PATENT NO. : 6,074,108
DATED : June 13, 2000
INVENTOR(S) : Ohwaki, et. al.

It is certified that error appears in the above-identified patent and that said Letters Patent is hereby corrected as shown below:

In column 2, line 6, change "Inventors" to - - inventors - -.
In column 2, line 28, after "cleaning" delete - - the - -.
In column 2, line 57, after "may" insert - - be - -.
In column 3, line 11, change "This" to - - this - -.
In column 5, line 37, after "31a" delete period.
In column 8, line 5, change "This" to - - this - -.
In column 8, line 23, change "This" to - - this - -.
In column 8, line 63, change "³4a" to - - 34a - -.
In column 11, line 17, after "it" insert - - is - -.
In column 11, line 22, after "it" insert - - is - -.
In column 13, line 57, change "a" to - - as - -.
In column 14, line 44, change "90-°" to - - 90° - -.

Signed and Sealed this

Twenty-second Day of May, 2001

Attest:

NICHOLAS P. GODICI

*Attesting Officer*  *Acting Director of the United States Patent and Trademark Office*